US011875744B2

(12) United States Patent
Chaji

(10) Patent No.: US 11,875,744 B2
(45) **Date of Patent: *Jan. 16, 2024**

(54) CLEANING COMMON UNWANTED SIGNALS FROM PIXEL MEASUREMENTS IN EMISSIVE DISPLAYS

(71) Applicant: Ignis Innovation Inc., Waterloo (CA)

(72) Inventor: Gholamreza Chaji, Waterloo (CA)

(73) Assignee: Ignis Innovation Inc., Road Town (VG)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,564

(22) Filed: Aug. 24, 2022

(65) Prior Publication Data

US 2022/0406255 A1 Dec. 22, 2022

Related U.S. Application Data

(63) Continuation of application No. 17/079,572, filed on Oct. 26, 2020, now Pat. No. 11,462,161, which is a (Continued)

(51) Int. Cl.

*G09G 3/3233* (2016.01)
*G09G 3/00* (2006.01)

(52) U.S. Cl.

CPC .......... *G09G 3/3233* (2013.01); *G09G 3/006* (2013.01); *G09G 2300/043* (2013.01);

(Continued)

(58) Field of Classification Search

CPC ....... G09G 2300/043; G09G 2320/029; G09G 2320/043; G09G 2320/045; G09G 2320/12; G09G 3/0006; G09G 3/3233

See application file for complete search history.

(56) References Cited

U.S. PATENT DOCUMENTS 3,506,851 A 4/1970 Polkinghorn et al.
3,774,055 A 11/1973 Bapat et al.

(Continued)

FOREIGN PATENT DOCUMENTS

CA 1 294 034 1/1992
CA 2 109 951 11/1992

(Continued)

OTHER PUBLICATIONS

Almood et al.: "Effect of threshold voltage instability on field effect mobility in thin film transistors deduced from constant current measurements"; dated Aug. 2009.

(Continued)

*Primary Examiner* — Kenneth Bukowski
(74) *Attorney, Agent, or Firm* — Stratford Group Ltd.

(57) ABSTRACT

Methods of compensating for common unwanted signals present in pixel data measurements of a pixel circuit in a display having a plurality of pixel circuits each including a storage device, a drive transistor, and a light emitting device. First pixel data is measured from a first pixel circuit through a monitor line. Second pixel data from the first pixel circuit or a second pixel circuit is measured through the monitor line or another monitor line. The first measured pixel data or the second measured pixel data or both are used to clean the other of the first measured pixel data or the second measured pixel data of common unwanted signals to produce cleaned data for parameter extraction from the first pixel and/or second pixel.

19 Claims, 15 Drawing Sheets

Related U.S. Application Data continuation of application No. 15/801,726, filed on Nov. 2, 2017, now Pat. No. 10,847,087, which is a continuation of application No. 14/494,127, filed on Sep. 23, 2014, now Pat. No. 9,830,857, which is a continuation-in-part of application No. 14/154,945, filed on Jan. 14, 2014, now Pat. No. 9,171,504.

(60) Provisional application No. 61/764,859, filed on Feb. 14, 2013, provisional application No. 61/755,024, filed on Jan. 22, 2013, provisional application No. 61/754,211, filed on Jan. 18, 2013, provisional application No. 61/752,269, filed on Jan. 14, 2013.

(52) U.S. Cl.
CPC . *G09G 2320/029* (2013.01); *G09G 2320/043* (2013.01); *G09G 2320/045* (2013.01); *G09G 2330/12* (2013.01)

(56) References Cited

U.S. PATENT DOCUMENTS 4,090,096 A 5/1978 Nagami
4,160,934 A 7/1979 Kirsch
4,354,162 A 10/1982 Wright
4,943,956 A 7/1990 Noro
4,996,523 A 2/1991 Bell et al.
5,153,420 A 10/1992 Hack et al.
5,198,803 A 3/1993 Shie et al.
5,204,661 A 4/1993 Hack et al.
5,266,515 A 11/1993 Robb et al.
5,489,918 A 2/1996 Mosier
5,498,880 A 3/1996 Lee et al.
5,557,342 A 9/1996 Eto et al.
5,572,444 A 11/1996 Lentz et al.
5,589,847 A 12/1996 Lewis
5,619,033 A 4/1997 Weisfield
5,648,276 A 7/1997 Hara et al.
5,670,973 A 9/1997 Bassetti et al.
5,691,783 A 11/1997 Numao et al.
5,714,968 A 2/1998 Ikeda
5,723,950 A 3/1998 Wei et al.
5,744,824 A 4/1998 Kousai et al.
5,745,660 A 4/1998 Kolpatzik et al.
5,748,160 A 5/1998 Shieh et al.
5,815,303 A 9/1998 Berlin
5,870,071 A 2/1999 Kawahata
5,874,803 A 2/1999 Garbuzov et al.
5,880,582 A 3/1999 Sawada
5,903,248 A 5/1999 Irwin
5,917,280 A 6/1999 Burrows et al.
5,923,794 A 7/1999 McGrath et al.
5,945,972 A 8/1999 Okumura et al.
5,949,398 A 9/1999 Kim
5,952,789 A 9/1999 Stewart et al.
5,952,991 A 9/1999 Akiyama et al.
5,982,104 A 11/1999 Sasaki et al.
5,990,629 A 11/1999 Yamada et al.
6,023,259 A 2/2000 Howard et al.
6,069,365 A 5/2000 Chow et al.
6,091,203 A 7/2000 Kawashima et al.
6,097,360 A 8/2000 Holloman
6,144,222 A 11/2000 Ho
6,177,915 B1 1/2001 Beeteson et al.
6,229,506 B1 5/2001 Dawson et al.
6,229,508 B1 5/2001 Kane
6,246,180 B1 6/2001 Nishigaki
6,252,248 B1 6/2001 Sano et al.
6,259,424 B1 7/2001 Kurogane
6,262,589 B1 7/2001 Tamukai
6,271,825 B1 8/2001 Greene et al.
6,288,696 B1 9/2001 Holloman
6,304,039 B1 10/2001 Appelberg et al.
6,307,322 B1 10/2001 Dawson et al.
6,310,962 B1 10/2001 Chung et al.
6,320,325 B1 11/2001 Cok et al.
6,323,631 B1 11/2001 Juang
6,356,029 B1 3/2002 Hunter
6,373,454 B1 4/2002 Knapp et al.
6,392,617 B1 5/2002 Gleason
6,414,661 B1 7/2002 Shen et al.
6,417,825 B1 7/2002 Stewart et al.
6,433,488 B1 8/2002 Bu
6,437,106 B1 8/2002 Stoner et al.
6,445,369 B1 9/2002 Yang et al.
6,475,845 B2 11/2002 Kimura
6,501,098 B2 12/2002 Yamazaki
6,501,466 B1 12/2002 Yamagishi et al.
6,518,962 B2 2/2003 Kimura et al.
6,522,315 B2 2/2003 Ozawa et al.
6,525,683 B1 2/2003 Gu
6,531,827 B2 3/2003 Kawashima
6,542,138 B1 4/2003 Shannon et al.
6,555,420 B1 4/2003 Yamazaki
6,580,408 B1 6/2003 Bae et al.
6,580,657 B2 6/2003 Sanford et al.
6,583,398 B2 6/2003 Harkin
6,583,775 B1 6/2003 Sekiya et al.
6,594,606 B2 7/2003 Everitt
6,618,030 B2 9/2003 Kane et al.
6,639,244 B1 10/2003 Yamazaki et al.
6,668,645 B1 12/2003 Gilmour et al.
6,677,713 B1 1/2004 Sung
6,680,580 B1 1/2004 Sung
6,687,266 B1 2/2004 Ma et al.
6,690,000 B1 2/2004 Muramatsu et al.
6,690,344 B1 2/2004 Takeuchi et al.
6,693,388 B2 2/2004 Oomura
6,693,610 B2 2/2004 Shannon et al.
6,697,057 B2 2/2004 Koyama et al.
6,720,942 B2 4/2004 Lee et al.
6,724,151 B2 4/2004 Yoo
6,734,636 B2 5/2004 Sanford et al.
6,738,034 B2 5/2004 Kaneko et al.
6,738,035 B1 5/2004 Fan
6,753,655 B2 6/2004 Shih et al.
6,753,834 B2 6/2004 Mikami et al.
6,756,741 B2 6/2004 Li
6,756,952 B1 6/2004 Decaux et al.
6,756,985 B1 6/2004 Furuhashi et al.
6,771,028 B1 8/2004 Winters
6,777,712 B2 8/2004 Sanford et al.
6,777,888 B2 8/2004 Kondo
6,781,567 B2 8/2004 Kimura
6,806,497 B2 10/2004 Jo
6,806,638 B2 10/2004 Lin et al.
6,806,857 B2 10/2004 Sempel et al.
6,809,706 B2 10/2004 Shimoda
6,815,975 B2 11/2004 Nara et al.
6,828,950 B2 12/2004 Koyama
6,853,371 B2 2/2005 Miyajima et al.
6,859,193 B1 2/2005 Yumoto
6,873,117 B2 3/2005 Ishizuka
6,876,346 B2 4/2005 Anzai et al.
6,885,356 B2 4/2005 Hashimoto
6,900,485 B2 5/2005 Lee
6,903,734 B2 6/2005 Eu
6,909,243 B2 6/2005 Inukai
6,909,419 B2 6/2005 Zavracky et al.
6,911,960 B1 6/2005 Yokoyama
6,911,964 B2 6/2005 Lee et al.
6,914,448 B2 7/2005 Jinno
6,919,871 B2 7/2005 Kwon
6,924,602 B2 8/2005 Komiya
6,937,215 B2 8/2005 Lo
6,937,220 B2 8/2005 Kitaura et al.
6,940,214 B1 9/2005 Komiya et al.
6,943,500 B2 9/2005 LeChevalier
6,947,022 B2 9/2005 McCartney
6,954,194 B2 10/2005 Matsumoto et al.
6,956,547 B2 10/2005 et al.
6,975,142 B2 12/2005 Azami et al.
6,975,332 B2 12/2005 Arnold et al.

(56) References Cited

U.S. PATENT DOCUMENTS 6,995,510 B2 2/2006 Murakami et al.
6,995,519 B2 2/2006 Arnold et al.
7,023,408 B2 4/2006 Chen et al.
7,027,015 B2 4/2006 Booth, Jr. et al.
7,027,078 B2 4/2006 Reihl
7,034,793 B2 4/2006 Sekiya et al.
7,038,392 B2 5/2006 Libsch et al.
7,057,359 B2 6/2006 Hung et al.
7,061,451 B2 6/2006 Kimura
7,064,733 B2 6/2006 Cok et al.
7,071,932 B2 7/2006 Libsch et al.
7,088,051 B1 8/2006 Cok
7,088,052 B2 8/2006 Kimura
7,102,378 B2 9/2006 Kuo et al.
7,106,285 B2 9/2006 Naugler
7,112,820 B2 9/2006 Chang et al.
7,116,058 B2 10/2006 Lo et al.
7,119,493 B2 10/2006 Fryer et al.
7,122,835 B1 10/2006 Ikeda et al.
7,127,380 B1 10/2006 Iverson et al.
7,129,914 B2 10/2006 Knapp et al.
7,164,417 B2 1/2007 Cok
7,193,589 B2 3/2007 Yoshida et al.
7,224,332 B2 5/2007 Cok
7,227,519 B1 6/2007 Kawase et al.
7,245,277 B2 7/2007 Ishizuka
7,248,236 B2 7/2007 Nathan et al.
7,262,753 B2 8/2007 Tanghe et al.
7,274,363 B2 9/2007 Ishizuka et al.
7,310,092 B2 12/2007 Imamura
7,315,295 B2 1/2008 Kimura
7,321,348 B2 1/2008 Cok et al.
7,339,560 B2 3/2008 Sun
7,355,574 B1 4/2008 Leon et al.
7,358,941 B2 4/2008 Ono et al.
7,368,868 B2 5/2008 Sakamoto
7,411,571 B2 8/2008 Huh
7,414,600 B2 8/2008 Nathan et al.
7,423,617 B2 9/2008 Giraldo et al.
7,474,285 B2 1/2009 Kimura
7,502,000 B2 3/2009 Yuki et al.
7,528,812 B2 5/2009 Tsuge et al.
7,535,449 B2 5/2009 Miyazawa
7,554,512 B2 6/2009 Steer
7,569,849 B2 8/2009 Nathan et al.
7,576,718 B2 8/2009 Miyazawa
7,580,012 B2 8/2009 Kim et al.
7,589,707 B2 9/2009 Chou
7,609,239 B2 10/2009 Chang
7,619,594 B2 11/2009 Hu
7,619,597 B2 11/2009 Nathan et al.
7,633,470 B2 12/2009 Kane
7,656,370 B2 2/2010 Schneider et al.
7,800,558 B2 9/2010 Routley et al.
7,847,764 B2 12/2010 Cok et al.
7,859,492 B2 12/2010 Kohno
7,868,859 B2 1/2011 Tomida et al.
7,876,294 B2 1/2011 Sasaki et al.
7,924,249 B2 4/2011 Nathan et al.
7,932,883 B2 4/2011 Klompenhouwer et al.
7,969,390 B2 6/2011 Yoshida
7,978,187 B2 7/2011 Nathan et al.
7,994,712 B2 8/2011 Sung et al.
8,026,876 B2 9/2011 Nathan et al.
8,049,420 B2 11/2011 Tamura et al.
8,077,123 B2 12/2011 Naugler, Jr.
8,115,707 B2 2/2012 Nathan et al.
8,223,177 B2 7/2012 Nathan et al.
8,232,939 B2 7/2012 Nathan et al.
8,259,044 B2 9/2012 Nathan et al.
8,264,431 B2 9/2012 Bulovic et al.
8,279,143 B2 10/2012 Nathan et al.
8,339,386 B2 12/2012 Leon et al.
2001/0002703 A1 6/2001 Koyama
2001/0009283 A1 7/2001 Arao et al.
2001/0024181 A1 9/2001 Kubota
2001/0024186 A1 9/2001 Kane et al.
2001/0026257 A1 10/2001 Kimura
2001/0030323 A1 10/2001 Ikeda
2001/0040541 A1 11/2001 Yoneda et al.
2001/0043173 A1 11/2001 Troutman
2001/0045929 A1 11/2001 Prache
2001/0052606 A1 12/2001 Sempel et al.
2001/0052940 A1 12/2001 Hagihara et al.
2002/0000576 A1 1/2002 Inukai
2002/0011796 A1 1/2002 Koyama
2002/0011799 A1 1/2002 Kimura
2002/0012057 A1 1/2002 Kimura
2002/0014851 A1 2/2002 Tai et al.
2002/0018034 A1 2/2002 Ohki et al.
2002/0030190 A1 3/2002 Ohtani et al.
2002/0047565 A1 4/2002 Nara et al.
2002/0052086 A1 5/2002 Maeda
2002/0067134 A1 6/2002 Kawashima
2002/0084463 A1 7/2002 Sanford et al.
2002/0101172 A1 8/2002 Bu
2002/0105279 A1 8/2002 Kimura
2002/0117722 A1 8/2002 Osada et al.
2002/0122308 A1 9/2002 Ikeda
2002/0158587 A1 10/2002 Komiya
2002/0158666 A1 10/2002 Azami et al.
2002/0158823 A1 10/2002 Zavracky et al.
2002/0167474 A1 11/2002 Everitt
2002/0180369 A1 12/2002 Koyama
2002/0180721 A1 12/2002 Kimura et al.
2002/0186214 A1 12/2002 Siwinski
2002/0190924 A1 12/2002 Asano et al.
2002/0190971 A1 12/2002 Nakamura et al.
2002/0195967 A1 12/2002 Kim et al.
2002/0195968 A1 12/2002 Sanford et al.
2003/0020413 A1 1/2003 Oomura
2003/0030603 A1 2/2003 Shimoda
2003/0043088 A1 3/2003 Booth et al.
2003/0057895 A1 3/2003 Kimura
2003/0058226 A1 3/2003 Bertram et al.
2003/0062524 A1 4/2003 Kimura
2003/0063081 A1 4/2003 Kimura et al.
2003/0071821 A1 4/2003 Sundahl et al.
2003/0076048 A1 4/2003 Rutherford
2003/0090447 A1 5/2003 Kimura
2003/0090481 A1 5/2003 Kimura
2003/0107560 A1 6/2003 Yumoto et al.
2003/0111966 A1 6/2003 Mikami et al.
2003/0122745 A1 7/2003 Miyazawa
2003/0122813 A1 7/2003 Ishizuki et al.
2003/0142088 A1 7/2003 LeChevalier
2003/0151569 A1 8/2003 Lee et al.
2003/0156101 A1 8/2003 Le Chevalier
2003/0174152 A1 9/2003 Noguchi
2003/0179626 A1 9/2003 Sanford et al.
2003/0197663 A1 10/2003 Lee et al.
2003/0210256 A1 11/2003 Mori et al.
2003/0230141 A1 12/2003 Gilmour et al.
2003/0230980 A1 12/2003 Forrest et al.
2003/0231148 A1 12/2003 Lin et al.
2004/0032382 A1 2/2004 Cok et al.
2004/0066357 A1 4/2004 Kawasaki
2004/0070557 A1 4/2004 Asano et al.
2004/0070565 A1 4/2004 Nayar et al.
2004/0090186 A1 5/2004 Kanauchi et al.
2004/0090400 A1 5/2004 Yoo
2004/0095297 A1 5/2004 Libsch et al.
2004/0100427 A1 5/2004 Miyazawa
2004/0108518 A1 6/2004 Jo
2004/0135749 A1 7/2004 Kondakov et al.
2004/0140982 A1 7/2004 Pate
2004/0145547 A1 7/2004 Oh
2004/0150592 A1 8/2004 Mizukoshi et al.
2004/0150594 A1 8/2004 Koyama et al.
2004/0150595 A1 8/2004 Kasai
2004/0155841 A1 8/2004 Kasai
2004/0174347 A1 9/2004 Sun et al.
2004/0174354 A1 9/2004 Ono et al.
2004/0178743 A1 9/2004 Miller et al.

(56) References Cited

U.S. PATENT DOCUMENTS

2004/0183759 A1 9/2004 Stevenson et al.
2004/0196275 A1 10/2004 Hattori
2004/0207615 A1 10/2004 Yumoto
2004/0227697 A1 11/2004 Mori
2004/0239596 A1 12/2004 Ono et al.
2004/0252089 A1 12/2004 Ono et al.
2004/0257313 A1 12/2004 Kawashima et al.
2004/0257353 A1 12/2004 Imamura et al.
2004/0257355 A1 12/2004 Naugler
2004/0263437 A1 12/2004 Hattori
2004/0263444 A1 12/2004 Kimura
2004/0263445 A1 12/2004 Inukai et al.
2004/0263541 A1 12/2004 Takeuchi et al.
2005/0007355 A1 1/2005 Miura
2005/0007357 A1 1/2005 Yamashita et al.
2005/0017650 A1 1/2005 Fryer et al.
2005/0024081 A1 2/2005 Kuo et al.
2005/0024393 A1 2/2005 Kondo et al.
2005/0030267 A1 2/2005 Tanghe et al.
2005/0057484 A1 3/2005 Diefenbaugh et al.
2005/0057580 A1 3/2005 Yamano et al.
2005/0067970 A1 3/2005 Libsch et al.
2005/0067971 A1 3/2005 Kane
2005/0068270 A1 3/2005 Awakura
2005/0068275 A1 3/2005 Kane
2005/0073264 A1 4/2005 Matsumoto
2005/0083323 A1 4/2005 Suzuki et al.
2005/0088103 A1 4/2005 Kageyama et al.
2005/0110420 A1 5/2005 Arnold et al.
2005/0110807 A1 5/2005 Chang
2005/0140598 A1 6/2005 Kim et al.
2005/0140610 A1 6/2005 Smith et al.
2005/0145891 A1 7/2005 Abe
2005/0156831 A1 7/2005 Yamazaki et al.
2005/0168416 A1 8/2005 Hashimoto et al.
2005/0179626 A1 8/2005 Yuki et al.
2005/0179628 A1 8/2005 Kimura
2005/0185200 A1 8/2005 Tobol
2005/0200575 A1 9/2005 Kim et al.
2005/0206590 A1 9/2005 Sasaki et al.
2005/0219184 A1 10/2005 Zehner et al.
2005/0248515 A1 11/2005 Naugler et al.
2005/0269959 A1 12/2005 Uchino et al.
2005/0269960 A1 12/2005 Ono et al.
2005/0280615 A1 12/2005 Cok et al.
2005/0280766 A1 12/2005 Johnson et al.
2005/0285822 A1 12/2005 Reddy et al.
2005/0285825 A1 12/2005 Eom et al.
2006/0001613 A1 1/2006 Routley et al.
2006/0007072 A1 1/2006 Choi et al.
2006/0007249 A1 1/2006 Reddy et al.
2006/0012310 A1 1/2006 Chen et al.
2006/0012311 A1 1/2006 Ogawa
2006/0022305 A1 2/2006 Yamashita
2006/0027807 A1 2/2006 Nathan et al.
2006/0030084 A1 2/2006 Young
2006/0038758 A1 2/2006 Routley et al.
2006/0038762 A1 2/2006 Chou
2006/0066533 A1 3/2006 Sato et al.
2006/0077135 A1 4/2006 Cok et al.
2006/0082523 A1 4/2006 Guo et al.
2006/0092185 A1 5/2006 Jo et al.
2006/0097628 A1 5/2006 Suh et al.
2006/0097631 A1 5/2006 Lee
2006/0103611 A1 5/2006 Choi
2006/0149493 A1 7/2006 Sambandan et al.
2006/0170623 A1 8/2006 Naugler, Jr. et al.
2006/0176250 A1 8/2006 Nathan et al.
2006/0208961 A1 9/2006 Nathan et al.
2006/0214888 A1 9/2006 Schneider et al.
2006/0232522 A1 10/2006 Roy et al.
2006/0244697 A1 11/2006 Lee et al.
2006/0261841 A1 11/2006 Fish
2006/0273997 A1 12/2006 Nathan et al.
2006/0284801 A1 12/2006 Yoon et al.
2006/0284895 A1 12/2006 Marcu et al.
2006/0290618 A1 12/2006 Goto
2007/0001937 A1 1/2007 Park et al.
2007/0001939 A1 1/2007 Hashimoto et al.
2007/0008251 A1 1/2007 Kohno et al.
2007/0008268 A1 1/2007 Park et al.
2007/0008297 A1 1/2007 Bassetti
2007/0057873 A1 3/2007 Uchino et al.
2007/0069998 A1 3/2007 Naugler et al.
2007/0075727 A1 4/2007 Nakano et al.
2007/0076226 A1 4/2007 Klompenhouwer et al.
2007/0080905 A1 4/2007 Takahara
2007/0080906 A1 4/2007 Tanabe
2007/0080908 A1 4/2007 Nathan et al.
2007/0097038 A1 5/2007 Yamazaki et al.
2007/0097041 A1 5/2007 Park et al.
2007/0103419 A1 5/2007 Uchino et al.
2007/0115221 A1 5/2007 Buchhauser et al.
2007/0182671 A1 8/2007 Nathan et al.
2007/0236517 A1 10/2007 Kimpe
2007/0241999 A1 10/2007 Lin
2007/0273294 A1 11/2007 Nagayama
2007/0285359 A1 12/2007 Ono
2007/0290958 A1 12/2007 Cok
2007/0296672 A1 12/2007 Kim et al.
2008/0001525 A1 1/2008 Chao et al.
2008/0001544 A1 1/2008 Murakami et al.
2008/0036708 A1 2/2008 Shirasaki
2008/0042942 A1 2/2008 Takahashi
2008/0042948 A1 2/2008 Yamashita et al.
2008/0048951 A1 2/2008 Naugler, Jr. et al.
2008/0055209 A1 3/2008 Cok
2008/0074413 A1 3/2008 Ogura
2008/0088549 A1 4/2008 Nathan et al.
2008/0088648 A1 4/2008 Nathan et al.
2008/0116787 A1 5/2008 Hsu et al.
2008/0117144 A1 5/2008 Nakano et al.
2008/0150847 A1 6/2008 Kim et al.
2008/0158115 A1 7/2008 Cordes et al.
2008/0211749 A1 9/2008 Weitbruch et al.
2008/0231558 A1 9/2008 Naugler
2008/0231562 A1 9/2008 Kwon
2008/0252571 A1 10/2008 Hente et al.
2008/0290805 A1 11/2008 Yamada et al.
2008/0297055 A1 12/2008 Miyake et al.
2009/0058772 A1 3/2009 Lee
2009/0121994 A1 5/2009 Miyata
2009/0160743 A1 6/2009 Tomida et al.
2009/0174628 A1 7/2009 Wang et al.
2009/0184901 A1 7/2009 Kwon
2009/0195483 A1 8/2009 Naugler, Jr. et al.
2009/0201281 A1 8/2009 Routley et al.
2009/0213046 A1 8/2009 Nam
2010/0004891 A1 1/2010 Ahlers et al.
2010/0026725 A1 2/2010 Smith
2010/0039422 A1 2/2010 Seto
2010/0039458 A1 2/2010 Nathan et al.
2010/0060911 A1 3/2010 Marcu et al.
2010/0165002 A1 7/2010 Ahn
2010/0194670 A1 8/2010 Cok
2010/0207960 A1 8/2010 Kimpe et al.
2010/0277400 A1 11/2010 Jeong
2010/0315319 A1 12/2010 Cok et al.
2011/0069051 A1 3/2011 Nakamura et al.
2011/0069089 A1 3/2011 Kopf et al.
2011/0074750 A1 3/2011 Leon et al.
2011/0149166 A1 6/2011 Botzas et al.
2011/0227964 A1 9/2011 Chaji et al.
2011/0254871 A1 10/2011 Yoo et al.
2011/0273399 A1 11/2011 Lee
2011/0279444 A1* 11/2011 Chung ................. G09G 3/3233 345/214
2011/0293480 A1 12/2011 Mueller
2012/0056558 A1 3/2012 Toshiya et al.
2012/0062565 A1 3/2012 Fuchs et al.
2012/0299978 A1 11/2012 Chaji
2013/0027381 A1 1/2013 Nathan et al.

(56) References Cited

U.S. PATENT DOCUMENTS

| | | | |
|---|---|---|---|
| 2013/0057595 | A1 | 3/2013 | Nathan et al. |
| 2013/0112960 | A1 | 5/2013 | Chaji et al. |

FOREIGN PATENT DOCUMENTS

| | | | |
|---|---|---|---|
| CA | 2 249 592 | | 7/1998 |
| CA | 2 368 386 | | 9/1999 |
| CA | 2 354 018 | | 6/2000 |
| CA | 2 432 530 | | 7/2002 |
| CA | 2 436 451 | | 8/2002 |
| CA | 2 438 577 | | 8/2002 |
| CA | 2 463 653 | | 1/2004 |
| CA | 2 498 136 | | 3/2004 |
| CA | 2 522 396 | | 11/2004 |
| CA | 2 443 206 | | 3/2005 |
| CA | 2 472 671 | | 12/2005 |
| CA | 2 567 076 | | 1/2006 |
| CA | 2 526 782 | | 4/2006 |
| CA | 2 242 720 | | 1/2008 |
| CA | 2 550 102 | | 4/2008 |
| CA | 2 773 699 | | 10/2013 |
| CN | 1381032 | | 11/2002 |
| CN | 1448908 | | 10/2003 |
| CN | 1703731 | | 11/2005 |
| CN | 1760945 | | 4/2006 |
| CN | 1897093 | | 1/2007 |
| CN | 102656621 | | 9/2012 |
| CN | 102725786 | | 10/2012 |
| EP | 0 158 366 | | 10/1985 |
| EP | 1 028 471 | | 8/2000 |
| EP | 1 111 577 | | 6/2001 |
| EP | 1 130 565 | A1 | 9/2001 |
| EP | 1 194 013 | | 4/2002 |
| EP | 1 335 430 | A1 | 8/2003 |
| EP | 1 372 136 | | 12/2003 |
| EP | 1 381 019 | | 1/2004 |
| EP | 1 418 566 | | 5/2004 |
| EP | 1 429 312 | A | 6/2004 |
| EP | 145 0341 | A | 8/2004 |
| EP | 1 465 143 | A | 10/2004 |
| EP | 1 469 448 | A | 10/2004 |
| EP | 1 521 203 | A2 | 4/2005 |
| EP | 1 594 347 | | 11/2005 |
| EP | 1 784 055 | A2 | 5/2007 |
| EP | 1854338 | A1 | 11/2007 |
| EP | 1 879 169 | A1 | 1/2008 |
| EP | 1 879 172 | | 1/2008 |
| GB | 2 389 951 | | 12/2003 |
| JP | 1272298 | | 10/1989 |
| JP | 4-042619 | | 2/1992 |
| JP | 6-314977 | | 11/1994 |
| JP | 8-340243 | | 12/1996 |
| JP | 09-090405 | | 4/1997 |
| JP | 10-254410 | | 9/1998 |
| JP | 11-202295 | | 7/1999 |
| JP | 11-219146 | | 8/1999 |
| JP | 11 231805 | | 8/1999 |
| JP | 11-282419 | | 10/1999 |
| JP | 2000-056847 | | 2/2000 |
| JP | 2000-81607 | | 3/2000 |
| JP | 2001-134217 | | 5/2001 |
| JP | 2001-195014 | | 7/2001 |
| JP | 2002-055654 | | 2/2002 |
| JP | 2002-91376 | | 3/2002 |
| JP | 2002-514320 | | 5/2002 |
| JP | 2002-278513 | | 9/2002 |
| JP | 2002-333862 | | 11/2002 |
| JP | 2003-076331 | | 3/2003 |
| JP | 2003-124519 | | 4/2003 |
| JP | 2003-177709 | | 6/2003 |
| JP | 2003-271095 | | 9/2003 |
| JP | 2003-308046 | | 10/2003 |
| JP | 2003-317944 | | 11/2003 |
| JP | 2004-004675 | | 1/2004 |
| JP | 2004-145197 | | 5/2004 |
| JP | 2004-287345 | | 10/2004 |
| JP | 2005-057217 | | 3/2005 |
| JP | 4-158570 | | 10/2008 |
| KR | 2004-0100887 | | 12/2004 |
| TW | 342486 | | 10/1998 |
| TW | 473622 | | 1/2002 |
| TW | 485337 | | 5/2002 |
| TW | 502233 | | 9/2002 |
| TW | 538650 | | 6/2003 |
| TW | 1221268 | | 9/2004 |
| TW | 1223092 | | 11/2004 |
| TW | 200727247 | | 7/2007 |
| WO | WO 1998/48403 | | 10/1998 |
| WO | WO 1999/48079 | | 9/1999 |
| WO | WO 2001/06484 | | 1/2001 |
| WO | WO 2001/27910 | A1 | 4/2001 |
| WO | WO 2001/63587 | A2 | 8/2001 |
| WO | WO 2002/067327 | A | 8/2002 |
| WO | WO 2003/001496 | A1 | 1/2003 |
| WO | WO 2003/034389 | A | 4/2003 |
| WO | WO 2003/058594 | A1 | 7/2003 |
| WO | WO 2003/063124 | | 7/2003 |
| WO | WO 2003/077231 | | 9/2003 |
| WO | WO 2004/003877 | | 1/2004 |
| WO | WO 2004/025615 | A | 3/2004 |
| WO | WO 2004/034364 | | 4/2004 |
| WO | WO 2004/047058 | | 6/2004 |
| WO | WO 2004/104975 | A1 | 12/2004 |
| WO | WO 2005/022498 | | 3/2005 |
| WO | WO 2005/022500 | A | 3/2005 |
| WO | WO 2005/029455 | | 3/2005 |
| WO | WO 2005/029456 | | 3/2005 |
| WO | WO 2005/055185 | | 6/2005 |
| WO | WO 2006/000101 | A1 | 1/2006 |
| WO | WO 2006/053424 | | 5/2006 |
| WO | WO 2006/063448 | A | 6/2006 |
| WO | WO 2006/084360 | | 8/2006 |
| WO | WO 2007/003877 | A | 1/2007 |
| WO | WO 2007/079572 | | 7/2007 |
| WO | WO 2007/120849 | A2 | 10/2007 |
| WO | WO 2009/055920 | | 5/2009 |
| WO | WO 2010/023270 | | 3/2010 |
| WO | WO 2011/041224 | A1 | 4/2011 |
| WO | WO 2011/064761 | A1 | 6/2011 |
| WO | WO 2011/067729 | | 6/2011 |

OTHER PUBLICATIONS

Alexander et al.: "Pixel circuits and drive schemes for glass and elastic AMOLED displays"; dated Jul. 2005 (9 pages).
Alexander et al.: "Unique Electrical Measurement Technology for Compensation, Inspection, and Process Diagnostics of AMOLED HDTV"; dated May 2010 (4 pages).
Ashtiani et al.: "AMOLED Pixel Circuit With Electronic Compensation of Luminance Degradation"; dated Mar. 2007 (4 pages).
Chaji et al.: "A Cunent-Mode Comparator for Digital Calibration of Amorphous Silicon AMOLED Displays"; dated Jul. 2008 (5 pages).
Chaji et al.: "A fast settling current driver bawd on the CCII for AMOLED displays"; dated Dec. 2009 (6 pages).
Chaji et al.: "A Low-Cost Stable Amorphous Silicon AMOLED Display with Full V~T- and V~O~L~E~D Shift Compensation"; dated May 2007 (4 pages).
Chaji et al.: "A low-power driving scheme for a-Si:H active-matrix organic light-emitting diode displays"; dated Jun. 2005 (4 pages).
Chaji et al.: "A low-power high-performance digital circuit for deep submicron technologies"; dated Jun. 2005 (4 pages).
Chaji et al.: "A novel a-Si:H AMOLED pixel cinmit based on short-term stress stability of a-Si:H TFTs"; dated Oct. 2005 (3 pages).
Chaji et al.: "A Novel Driving Scheme and Pixel Circuit for AMOLED Displays"; dated Jun. 2006 (4 pages).
Chaji et al.: "A Novel Driving Scheme for High Resolution Large-area a-Si:H AMOLED displays"; dated Aug. 2115 (3 pages).
Chaji et al.: "A Stable Voltage-Programmed Pixel Circuit for a-Si:H AMOLED Displays"; dated Dec. 2006 (12 pages).

(56) References Cited

OTHER PUBLICATIONS

Chaji et al.: "A Sub-μA fast-settling current-programmed pixel circuit for AMOLED displays"; dated Sep. 2007.
Chaji et al.: "An Enhanced and Simplified Optical Feedback Pixel Circuit for AMOLED Displays"; dated Oct. 2006.
Chaji et al.: "Compensation technique for DC and transient instability of thin film transistor circuits for large-area devices"; dated Aug. 2008.
Chaji et al.: "Driving scheme for stable operation of 2-TFT a-Si AMOLED pixel"; dated Apr. 2005 (2 pages).
Chaji et al.: "Dynamic-effect compensating technique for stable a-Si:H AMOLED displays"; dated Aug. 2005 (4 pages).
Chaji et al.: "Electrical Compensation of OLED Luminance Degradation"; dated Dec. 2007 (3 pages).
Chaji et al.: "eUTDSP: a design study of a new VLIW-based DSP architecture"; dated May 2003 (4 pages).
Chaji et al.: "Fast and Offset-Leakage Insensitive Current-Mode Line Driver for Active Matrix Displays and Sensors"; dated Feb. 2009 (8 pages).
Chaji et al.: "High Speed Low Power Adder Design With a New Logic Style: Pseudo Dynamic Logic (SDL)"; dated Oct. 2191 (4 pages).
Chaji et al.: "High-precision, fast current source for large-area current-programmed a-Si flat panels"; dated Sep. 2006 (4 pages).
Chaji et al.: "Low-Cost AMOLED Television with IGNIS Compensating Technology"; dated May 2008 (4 pages).
Chaji et al.: "Low-Cost Stable a-Si:H AMOLED Display for Portable Applications"; dated Jun. 2006 (4 pages).
Chaji et al.: "Low-Power Low-Cost Voltage-Programmed a-Si:H AMOLED Display for Portable Devices"; dated Jun. 2008 (5 pages).
Chaji et al.: "Merged phototransistor pixel with enhanced near infrared response and flicker noise reduction for biomolecular imaging"; dated Nov. 2008 (3 pages).
Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High-Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated 2008 (177 pages).
European Search Report for Application No. EP 01 11 22313 dated Sep. 14, 2005 (4 pages).
European Search Report for Application No. EP 04 78 6661 dated Mar. 9, 2009.
European Search Report for Application No. EP 05 75 9141 dated Oct. 30, 2009 (2 pages).
European Search Report for Application No. EP 05 81 9617 dated Jan. 30, 2009.
European Search Report for Application No. EP 66 70 5133 dated Jul. 18, 2008.
European Search Report for Application No. EP 06 72 1798 dated Nov. 12, 2009 (2 pages).
European Search Report for Application No. EP 07 71 0608.6 dated Mar. 19, 2010 (7 pages).
European Search Report for Application No. EP 07 71 9579 dated May 20, 2009.
European Search Report for Application No. EP 07 81 5784 dated Jul. 20, 2010 (2 pages).
European Search Report for Application No. EP 10 16 6143, dated Sep. 3, 2010 (2 pages).
European Search Report for Application No. EP 111 83 4294.0-1903, dated Apr. 8, 2013, (9 pages).
European Search Report for Application No. EP 11 73 9485.8-1964 dated Aug. 6, 2013, (14 pages).
European Search Report for Application No. PCT/CA2006/000177 dated Jun. 2, 2006.
European Supplementary Search Report for Application No. EP 04 78 6662 dated Jan. 19, 2007 (2 pages).
Extended European Search Report for Application No. EP 09 73 3076.5, dated Apr. 27 (13 pages).
Extended European Search Report for Application No. EP 11 16 8677.0, dated Nov. 29, 2012, (13 page).
Extended European Search Report for Application No. EP 11 19 1641.7 dated Jul. 11, 2012 (14 pages).
Fossum, Eric R.. "Active Pixel Sensors: Are CCD's Dinosaurs?" SPIE: Symposium on Electronic Imaging. Feb. 1, 1993 (13 pages).
Goh et al., "A New a-Si:H Thin-Film Transistor Pixel Circuit for Active-Matrix Organic Light-Emitting Diodes", IEEE Electron Device Letters, vol. 24, No. 9, Sep. 2003, pp. 583-585.
International Preliminary Report on Patentability for Application No. PCT/CA2005/001007 dated Oct. 16, 2006, 4 pages.
International Search Report for Application No. PCT/CA2004/001741 dated Feb. 21, 2005.
International Search Report for Application No. PCT/CA2004/001742, Canadian Patent Office, dated Feb. 21, 2005 (2 pages).
International Search Report for Application No. PCT/CA2005/001007 dated Oct. 18, 2005.
International Search Report for Application No. PCT/CA2005/001897, dated Mar. 21, 2116 (2 pages).
International Search Report for Application No. PCT/CA2007/000652 dated Jul. 25, 2007.
International Search Report for Application No. PCT/CA2009/000501, dated Jul. 30, 2009 (4 pages).
International Search Report for Application No. PCT/CA2009/001769, dated Apr. 8, 2010 (3 pages).
International Search Report for Application No. PCT/IB2010/055481, dated Apr. 7, 2011, 3 pages.
International Search Report for Application No. PCT/IB2010/055486, dated Apr. 19, 2011, 5 pages.
International Search Report for Application No. PCT/IB2010/055541 filed Dec. 1, 2910, dated May 26, 2011; 5 pages.
International Search Report for Application No. PCT/IB2011/050502, dated Jun. 27, 2011 (6 pages).
International Search Report for Application No. PCT/IB2011/051103, dated Jul. 8, 2011, 3 pages.
International Search Report for Application No. PCT/IB2011/055135, Canadian Patent Office, dated Apr. 16, 2012 (5 pages).
International Search Report for Application No. PCT/IB2012/052372, dated Sep. 12, 2912 (3 pages).
International Search Report for Application No. PCT/IB2013/054251, Canadian Intellectual Property Office, dated Sep. 11, 2013; (4 pages).
International Search Report for Application No. PCT/JP02/09668, dated Dec. 3, 2002, (4 pages).
International Written Opinion for Application No. PCT/CA2004/001742, Canadian Patent Office, dated Feb. 21, 2005 (5 pages).
International Written Opinion for Application No. PCT/CA2005/001897, dated Mar. 21, 2006 (4 pages).
International Written Opinion for Application No. PCT/CA2009/000591 dated Jul. 30, 2009 (6 pages).
International Written Opinion for Application No. PCT/IB2010/055481, dated Apr. 7, 2011, 6 pages.
International Written Opinion for Application No. PCT/IB2010/055486, dated Apr. 19, 2011, 8 pages.
International Written Opinion for Application No. PCT/IB2010/055541, dated May 26, 2011; 6 pages.
International Written Opinion for Application No. PCT/IB2010/050502, dated Jun. 27, 2011 (7 pages).
International Written Opinion for Application No. PCT/IB2011/051103, dated Jul. 8, 2011, 6 pages.
International Written Opinion for Application No. PCT/IB2011/055135, Canadian Patent Office, dated Apr. 16, 2012 (5 pages).
International Written Opinion for Application No. PCT/IB2012/052372, dated Sep. 12, 2012 (6 pages).

(56) References Cited

OTHER PUBLICATIONS

International Written Opinion for Application No. PCT/IB2013/054251, Canadian Intellectual Property Office, dated Sep. 11, 2013; (5 pages).
Jafarabadiashtiani et al.: "A New Driving Method for a-Si AMOLED Displays Based on Voltage Feedback"; dated 2005 (4 pages).
Kanicki, J., et al. "Amorphous Silicon Thin-Film Transistors Based Active-Matrix Organic Light-Emitting Displays." Asia Display: International Display Workshops, Sep. 2001 (pp. 315-318).
Karim, K. S., et al. "Amorphous Silicon Active Pixel Sensor Readout Circuit for Digital Imaging." IEEE: Transactions on Electron Devices. vol. 59, No. 1, Jan. 2003 (pp. 200-208).
Lee et al.: "Ambipolar Thin-Film Transistors Fabricated by PECVD Nanocrystalline Silicon"; dated 2006.
Lee, Wonbok: "Thermal Management in Microprocessor Chips and Dynamic Backlight Control in Liquid Crystal Displays", Ph.D. Dissertation, University of Southern California (124 pages).
Ma E Yet al.: "organic light emitting diode/thin film transistor integration for foldable displays" dated Sep. 15, 1997(4 pages).
Matsueda y et al.: "35.1: 2.5-in. AMOLED with Integrated 6-bit Gamma Compensated Digital Data Driver"; dated May 2004.
Mendes E., et al. "A High Resolution Switch-Current Memory Base Cell." IEEE: Circuits and Systems. vol. 2, Aug. 1999 (pp. 718-721).
Nathan A. et al., "Thin Film imaging technology on glass and plastic" ICM 2000, proceedings of the 12 international conference on microelectronics, dated Oct. 31, 2001 (4 pages).
Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Nathan et al.: "Backplane Requirements for active Matrix Organic Light Emitting Diode Displays,"; dated 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOLED displays"; dated Dec. 2005 (11 pages).
Nathan et al.: "Invited Paper: a-Si for AMOLED—Meeting the Performance and Cost Demands of Display Applications (Cell Phone to HDTV)"; dated 2006 (4 pages).
Office Action in Japanese patent application No. JP2006-527247 dated Mar. 15, 2010. (8 pages).
Office Action in Japanese patent application No. JP2007-545796 dated Sep. 5, 2011. (8 pages).
Partial European Search Report for Application No. EP 11 168 677.0, dated Sep. 22, 2011 (5 pages).
Partial European Search Report for Application No. EP 11 19 1641.7, dated Mar. 20, 2012 (8 pages).
Philipp: "Charge transfer sensing" Sensor Review, vol. 19, No. 2, Dec. 31, 1999 (Dec. 31, 1999), 10 pages.
Rafati et al.: "Comparison of a 17 b multiplier in Dual-rail domino and in Dual-rail D L (D L) logic styles"; dated 2002 (4 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Safavian et al.: "Three-TFT image sensor for real-time digital X-ray imaging"; dated Feb. 2, 2006 (2 pages).
Search Report for Taiwan Invention Patent Application No. 093128894 dated May 1, 2012. (1 page).
Search Report for Taiwan Invention Patent Application No. 94144535 dated Nov. 1, 2012. (1 page).
Singh, et al., "Current Conveyor. Novel Universal Active Block", Samriddhi, S-JPSET vol. I, Issue 1, 2010, pp. 41-48 (12EPPT).
Spindler et al., System Considerations for RGBW OLED Displays, Journal of the SID 14/1, 2006, pp. 37-48.
Stewart M. et al., "polysilicon TFT technology for active matrix oled displays" IEEE transactions on electron devices, vol. 48, No. 5, dated May 2001 (7 pages).
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).
Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 599-592.
Yu, Jennifer: "Improve OLED Technology for Display", Ph.D. Dissertation, Massachusetts Institute of Technology, Sep. 2008 (151 pages).
International Search Report for Application No. PCT/IB2014/058244, Canadian Intellectual Property Office, dated Apr. 11, 2014; (6 pages).

* cited by examiner

500

CLEANING COMMON UNWANTED SIGNALS FROM PIXEL MEASUREMENTS IN EMISSIVE DISPLAYS

CROSS-REFERENCE TO RELATED APPLICATIONS

This application is a continuation of U.S. patent application Ser. No. 17/079,572, filed Oct. 26, 2020, now allowed, which is a continuation of U.S. patent application Ser. No. 15/801,726, filed Nov. 2, 2017, now U.S. Pat. No. 10,847,087, which is a continuation of U.S. patent application Ser. No. 14/494,127, filed Sep. 23, 2014, now U.S. Pat. No. 9,830,857, which is a continuation-in-part of U.S. patent application Ser. No. 14/154,945, filed Jan. 14, 2014, now U.S. Pat. No. 9,171,504, which claims the benefit of U.S. Provisional Patent Application Ser. No. 61/752,269 filed Jan. 14, 2013; U.S. Provisional Patent Application Ser. No. 61/754,211 filed Jan. 18, 2013; U.S. Provisional Patent Application Ser. No. 61/755,024 filed Jan. 22, 2013; and U.S. Provisional Patent Application Ser. No. 61/764,859 filed Feb. 14, 2013; all of which are incorporated herein in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE PRESENT DISCLOSURE

The present disclosure relates to detecting and addressing non-uniformities in display circuitry and cleaning common unwanted signals from pixel measurements in the same.

BACKGROUND

Organic light emitting devices (OLEDs) age when they conduct current. As a result of this aging, the input voltage that an OLED requires in order to generate a given current increases over time. Similarly, the amount of current required to emit a given luminance also increases with time, as OLED efficiency decreases.

Because OLEDs in pixels on different areas of a display panel are driven differently, these OLEDs age or degrade differently and at different rates, which can lead to visible differences and non-uniformities between pixels on a given display panel.

An aspect of the disclosed subject matter improves display technology by effectively detecting non-uniformities and/or degradation in displays, particularly light emitting displays, and allowing for quick and accurate compensation to overcome the non-uniformities and/or degradation. Another aspect relates to cleaning common unwanted signals from pixel measurements for pixel parameter extraction.

SUMMARY

A method of compensating for deviations by a measured device current from a reference current in a display having a plurality of pixel circuits each including a storage device, a drive transistor, and a light emitting device includes processing a voltage corresponding to a difference between a reference current and a measured first device current flowing through the drive transistor or the light emitting device of a selected one of the pixel circuits at a readout system. The method also includes converting the voltage into a corresponding quantized output signal indicative of the difference between the reference current and the measured first device current at the readout system. A controller then adjusts a programming value for the selected pixel circuit by an amount based on the quantized output signal such that the storage device of the selected pixel circuit is subsequently programmed with a current or voltage related to the adjusted programming value.

A method of compensating for deviations by a measured device current from a reference current in a display having a plurality of pixel circuits each including a storage device, a drive transistor, and a light emitting device includes performing a first reset operation on an integration circuit to restore the integration circuit to a first known state. The method also includes performing a first current integration operation at the integration circuit, the integration operation operative to integrate a first input current corresponding to a difference between a reference current and a measured first device current flowing through the drive transistor or the light emitting device of a selected one of the pixel circuits. A first voltage corresponding to the first integration operation is stored on a first storage capacitor, and a second reset operation is performed on the integration circuit, restoring the integration circuit to a second known state. A second current integration operation is performed at the integration circuit to integrate a second input current corresponding to the leakage current on a reference line, and a second voltage corresponding to the second current integration operation is stored on a second storage capacitor. The method also includes generating an amplified output voltage corresponding to the difference between the first voltage and the second voltage using one or more amplifiers and quantizing the amplified output voltage.

A method of compensating for deviations by a measured device current from a reference current in a display having a plurality of pixel circuits each including a storage device, a drive transistor, and a light emitting device includes performing a first reset operation on an integration circuit to restore the integration circuit to a first known state. The method also includes performing a first current integration operation at the integration circuit, the integration operation operative to integrate a first input current corresponding to a difference between a reference current and a measured first device current flowing through the drive transistor or the light emitting device of a selected one of the pixel circuits. A first voltage corresponding to the first integration operation is stored on a first storage capacitor, and a second reset operation is performed on the integration circuit, restoring the integration circuit to a second known state. A second current integration operation is performed at the integration circuit to integrate a second input current corresponding to the leakage current on a reference line, and a second voltage corresponding to the second current integration operation is stored on a second storage capacitor. The method also includes performing a multibit quantization operation based on the first stored voltage and the second stored voltage.

A system for compensating for deviations by a measured device current from a reference current in a display having a plurality of pixel circuits each including a storage device, a drive transistor, and a light emitting device includes a readout system. The readout system is configured to: a)

process a voltage corresponding to a difference between a reference current and a measured first device current flowing through the drive transistor or the light emitting device of a selected one of the pixel circuits and b) convert the voltage into a corresponding quantized output signal indicative of the difference between the reference current and the measured first device current. The system also includes a controller configured to adjust a programming value for the selected pixel circuit by an amount based on the quantized output signal such that the storage device of the selected pixel circuit is subsequently programmed with a current or voltage related to the adjusted programming value.

A system for compensating for deviations by a measured device current from a reference current in a display having a plurality of pixel circuits each including a storage device, a drive transistor, and a light emitting device includes a reset circuit. The reset circuit is configured to perform a) a first reset operation on an integration circuit, the reset operation restoring the integration circuit to a first known state and b) a second reset operation on the integration circuit, the reset operation restoring the integration circuit to a second known state. The system also includes an integration circuit configured to perform a) a first current integration operation, the first current integration operation operative to integrate a first input current corresponding to a difference between a reference current and a measured first device current flowing through the drive transistor or the light emitting device of a selected one of the pixel circuits and b) a second current integration operation at the integration circuit, the second integration operation operative to integrate a second input current corresponding to the leakage current on a reference line. In addition, the system includes a first storage capacitor configured to store a first voltage corresponding to the first current integration and a second storage capacitor configured to store a second voltage corresponding to the second current integration operation. The system also includes amplifier circuit configured to generate an amplified output voltage corresponding to the difference between the first voltage and the second voltage using one or more amplifiers and a quantizer circuit configured to quantize the amplified output voltage.

A system for compensating for deviations by a measured device current from a reference current in a display having a plurality of pixel circuits each including a storage device, a drive transistor, and a light emitting device includes a reset circuit. The reset circuit is configured to perform a) a first reset operation on an integration circuit, the first reset operation restoring the integration circuit to a first known state and b) a second reset operation on the integration circuit, the second reset operation restoring the integration circuit to a second known state. The system also includes an integration circuit configured to perform a) a first current integration operation at the integration circuit, the first integration operation operative to integrate a first input current corresponding to a difference between a reference current and a measured first device current flowing through the drive transistor or the light emitting device of a selected one of the pixel circuits and b) a second current integration operation at the integration circuit, the integration operation operative to integrate a second input current corresponding to the leakage current on a reference line. In addition, the system includes a first storage capacitor configured to store a first voltage corresponding to the first current integration operation and a second storage capacitor configured to store a second voltage corresponding to the second current integration operation. The system also includes a quantizer circuit configured to perform a multibit quantization operation based on the first stored voltage and the second stored voltage.

According to another aspect of the present disclosure, a method of compensating for common unwanted signals present in pixel data measurements of a pixel circuit in a display having a plurality of pixel circuits each including a storage device, a drive transistor, and a light emitting device is disclosed. The method includes: measuring first pixel data from a first pixel circuit through a monitor line; measuring second pixel data from the first pixel circuit or a second pixel circuit through the monitor line or another monitor line; and using either the first measured pixel data or the second measured pixel data to clean the other of the first measured pixel data or the second measured pixel data of common unwanted signals to produce cleaned data. The method can further include extracting one or more pixel parameters based on the cleaned data. The one or more pixel parameters includes any one or more of aging of the drive transistor, aging of the light emitting device, a process non-uniformity parameter, a mobility parameter, a threshold voltage of the drive transistor or a change thereof, or a threshold voltage of the light emitting device or a change thereof.

The measuring the first pixel data and the measuring the second pixel data can be carried out simultaneously or one after another. The using can include subtracting the first measured pixel data and the second measured pixel data in an analog or a digital domain. The measuring the second pixel data can be measured from the first pixel circuit through the monitor line. The measuring the second pixel data can be measured from the second pixel circuit through the monitor line or through the other monitor line.

The using can include comparing the first measured pixel data and the second measured pixel data. The common unwanted signals can include any one or more of noise, leakage, or offset.

The method can further include: before measuring the first pixel data, programming the first pixel circuit with first data; and before measuring the second pixel data, programming the first pixel circuit with second data. The method can still further include adjusting the first data or the second data so that the first pixel data is the same as the second pixel data. Alternately, the method can include: before measuring the first pixel data or the second pixel data, programming the first pixel circuit with first data and programming the second pixel circuit with second data; and extracting a pixel parameter for the first pixel circuit or the second pixel circuit based on the cleaned data. The method can still further include adjusting the first data or the second data so that the first pixel data is the same as the second pixel data.

The method can include sampling a signal external to the first pixel circuit and the second pixel circuit simultaneously with the measuring the first pixel data and the measuring the second pixel data. The measuring the first pixel data can include sampling a difference between the first pixel data and a first sample of the sampled external signal. The measuring the second pixel data can include sampling a difference between the first pixel data and a second sample of the sampled external signal. The first sample can have a zero value, and the second sample can have a non-zero value.

Additional aspects of the present disclosure will be apparent to those of ordinary skill in the art in view of the detailed description of various aspects, which is made with reference to the drawings, a brief description of which is provided below.

DETAILED DESCRIPTION

Figure 1A:
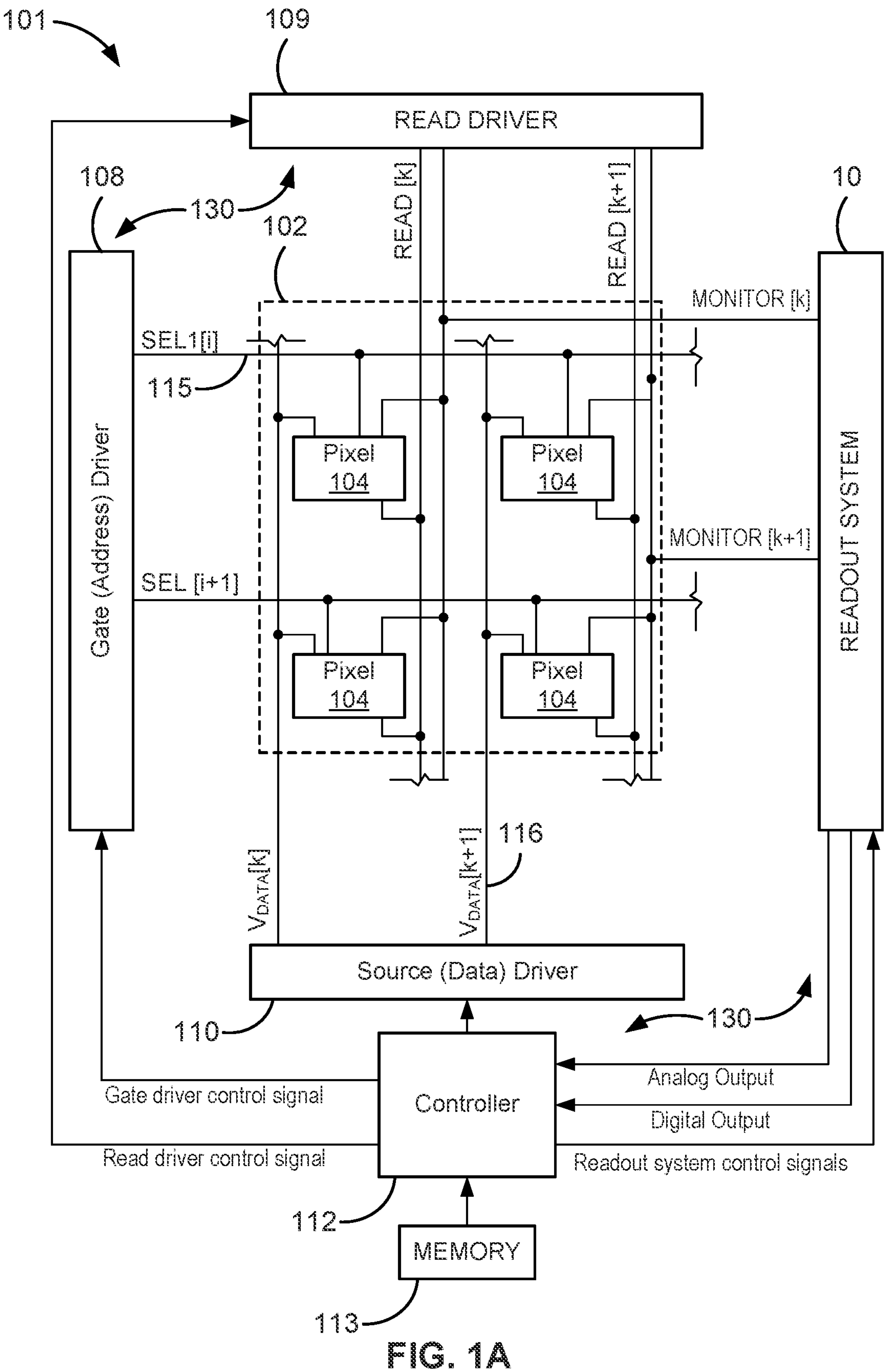
FIG. 1A illustrates an electronic display system or panel having an active matrix area or pixel array in which an array of pixels are arranged in a row and column configuration.

Systems and methods as disclosed herein can be used to detect and compensate for process or performance-related non-uniformities and/or degradation in light emitting displays. Disclosed systems use one or more readout systems to compare a device (e.g., pixel) current with one or more reference currents to generate an output signal indicative of the difference between the device and reference currents. The one or more readout systems can incorporate one or more current integrators and/or current comparators which can each be configured to generate the output signal using different circuitry. As will be described in further detail below, the disclosed current comparators and current comparators each offer their own advantages and can be used in order to meet certain performance requirements. In certain implementations, the output signal is in the form of an output voltage. This output voltage can be amplified, and the amplified signal can be digitized using single or multibit quantization. The quantized signal can then be used to determine how the device current differs from the reference current and to adjust the programming voltage for the device of interest accordingly.

Electrical non-uniformity effects can refer to random aberrations introduced during the manufacturing process of pixel circuits, such as originating from the distribution of different grain sizes. Degradation effects can refer to post-manufacturing time- or temperature- or stress-dependent effects on the semiconductor components of a pixel circuit, such as a shift in the threshold voltage of the drive transistor of a current-driven light emitting device or of the light emitting device, which causes a loss of electron mobility in the semiconductor components. Either or both effects can result in a loss of luminance, uneven luminance, and a number of other known undesirable performance-robbing and visual aberrations on the light emitting display. Degradation effects can sometimes be referred to as performance non-uniformities, as degradation can cause localized visual artifacts (e.g., luminance or brightness anomalies) to appear on the display. A "device current" or "measured current" or "pixel current" as used herein refers to a current (or corresponding voltage) that is measured from a device of a pixel circuit or from the pixel circuit as a whole. For example, the device current can represent a measured current flowing through either the drive transistor or the light emitting device within a given pixel circuit under measurement. Or, the device current can represent the current flowing through the entire pixel circuit. Note that the measurement can be in the form of a voltage initially instead of a current, and in this disclosure, the measured voltage is converted into a corresponding current to produce a "device current."

As mentioned above, the disclosed subject matter describes readout systems which can be used to convert a received current or currents into a voltage indicative of the difference between a device current and a reference current, which voltage can then be processed further. As will be described in further detail below the described readout systems perform these operations using current comparators and/or current integrators incorporated into the readout systems. Because the disclosed current comparators and current integrators process input signals reflective of a difference between a measured device current and a reference current instead of directly processing the device current itself, the disclosed current comparators and current integrators offer advantages over other detection circuits. For example, the disclosed current comparators and current integrators operate over a lower dynamic range of input currents than other detection circuits and can more accurately detect differences between reference and device currents. Additionally, according to certain implementations, by using an efficient readout and quantization process, the disclosed current comparators can offer faster performance than other detection circuitry. Similarly, the disclosed current integrators can offer superior noise performance because of their unique architecture. As explained herein, an aspect of the present disclosure determines and processes a difference between a measured current and a reference current, and then that difference is presented as an input voltage to a quantizer as disclosed herein. This is different from conventional detection circuits, which merely perform multibit quantization on a measured device current as one input, without comparing the device current to a known reference current or performing further processing on signals indicative of the difference between a device current and a known reference current.

In certain implementations, a user can select between a current comparator and a current integrator based on specific needs, as each device offers its own advantages, or a computer program can automatically select to use one or both of the current comparators or current integrators disclosed herein as a function of desired speed performance or noise performance. For example, current integrators can offer better noise suppression performance than current comparators, while current comparators can operate faster. Therefore, a current integrator can be selected to perform operations on signals that tend to be noisy, while a current comparator can be selected to perform current comparison operations for quickly changing input signals. Thus, a tradeoff can be achieved between selecting a current integrator as disclosed herein when low noise is important versus a comparator as disclosed herein when high speed is important.

While the present disclosure can be embodied in many different forms, there is shown in the drawings and will be described various exemplary aspects of the present disclosure with the understanding that the present disclosure is to be considered as an exemplification of the principles thereof and is not intended to limit the broad aspect of the present disclosure to the illustrated aspects.

FIG. 1A illustrates an electronic display system or panel 101 having an active matrix area or pixel array 102 in which an array of pixels 104 are arranged in a row and column configuration. For ease of illustration, only two rows and columns are shown. External to the active matrix area 102 is a peripheral area 106 where peripheral circuitry for driving and controlling the pixel area 102 are disposed. The peripheral circuitry includes a gate or address driver circuit 108, a read driver circuit 109, a source or data driver circuit 110, and a controller 112. The controller 112 controls the gate, read, and source drivers 108, 109, and 110. The gate driver 108, under control of the controller 112, operates on address or select lines SEL[i], SEL[i+1], and so forth, one for each row of pixels 104 in the pixel army 102. The read driver 109, under control of the controller 112, operates on read or monitor lines MON[k], MON[k+1], and so forth, one for each column of pixels 104 in the pixel array 102. The source driver circuit 110, under control of the controller 112, operates on voltage data lines Vdata[k], Vdata[k+1], and so forth, one for each column of pixels 104 in the pixel array 102. The voltage data lines carry voltage programming information to each pixel 104 indicative of a luminance (or brightness as subjectively perceived by an observer) of each light emitting device in the pixel 104. A storage element, such as a capacitor, in each pixel 104 stores the voltage programming information until an emission or driving cycle turns on the light emitting device, such as an organic light emitting device (OLED). During the driving cycle, the stored voltage programming information is used to illuminate each light emitting device at the programmed luminance.

The readout system 10 receives device currents from one or more pixels via the monitor lines 115, 116 (MON[k], MON [k+1]) and contains circuitry configured to compare one or more received device currents with one or more reference currents to generate an signal indicative of the difference between the device and reference currents. In certain implementations, the signal is in the form of a voltage. This voltage can be amplified, and the amplified voltage can be digitized using single or multibit quantization. In certain implementations, single bit quantization can be performed by a comparator incorporated in the readout system 10, while multibit quantization can be performed by circuitry external to the readout system 10. For example, circuitry operative to perform multibit quantization can optionally be included in controller 112 or in circuitry external to the panel 101.

The controller 112 can also determine how the device current differs from the reference current based on the quantized signal and adjust the programming voltage for the pixel accordingly. As will be described in further detail below, the programming voltage for the pixel can be iteratively adjusted as part of the process of determining how the device current differs from the reference current. In certain implementations, the controller 112 can communicate with a memory 113, storing data to and retrieving data from the memory 113 as necessary to perform controller operations.

In addition to the operations described above, in certain implementations, the controller 112 can also send control signals to the readout system 10. These control signals can include, for example, configuration signals for the readouts system, signals controlling whether a current integrator or current comparator is to be used, signals controlling signal timing, and signals controlling any other appropriate operations.

The components located outside of the pixel array 102 can be disposed in a peripheral area 130 around the pixel array 102 on the same physical substrate on which the pixel array 102 is disposed. These components include the gate driver 108, the read driver 109, the source driver 110, and the controller 112. Alternately, some of the components in the peripheral area can be disposed on the same substrate as the pixel array 102 while other components are disposed on a different substrate, or all of the components in the peripheral are can be disposed on a substrate different from the substrate on which the pixel array 102 is disposed.

Figure 1B:
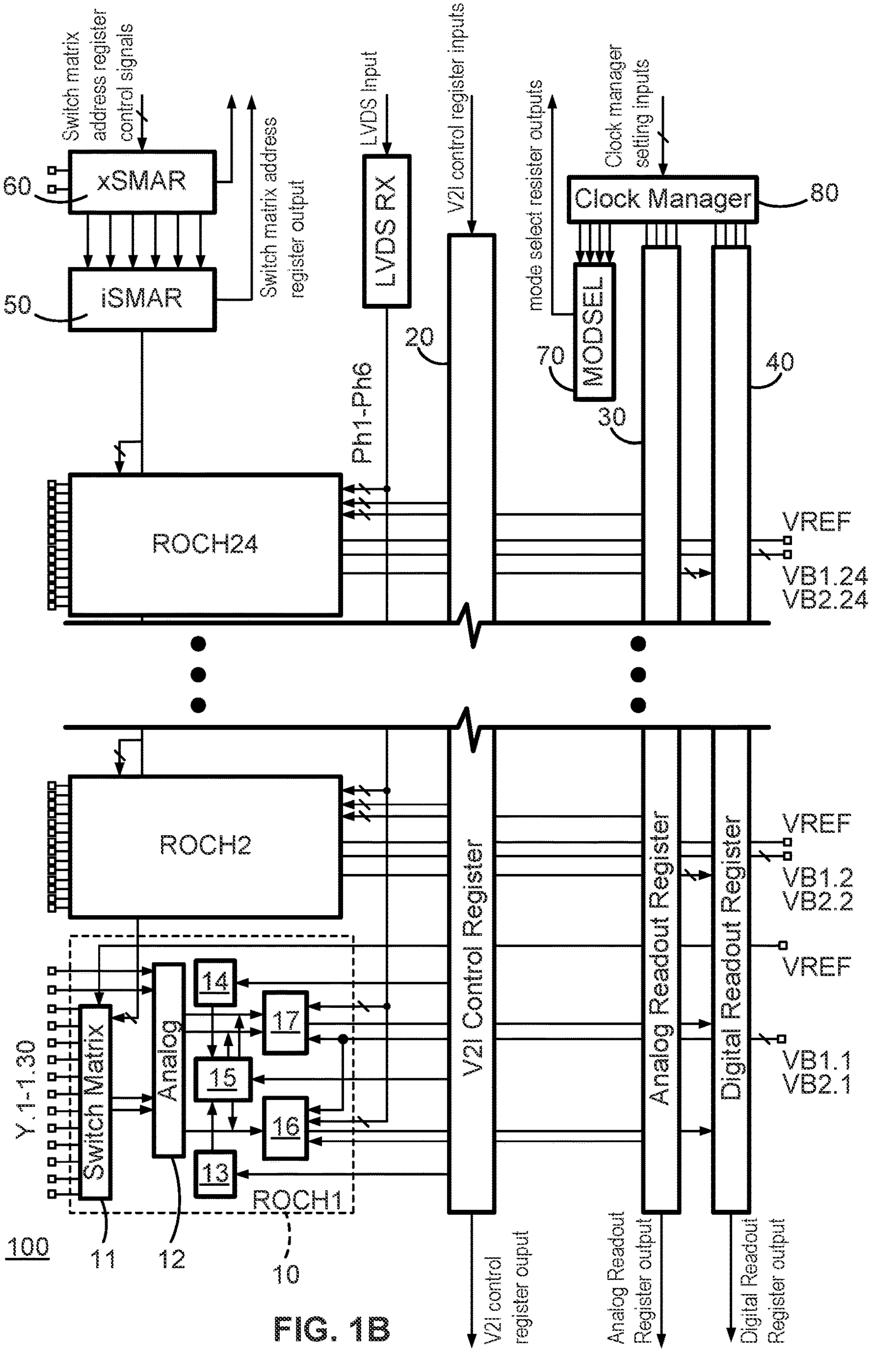
FIG. 1B is a functional block diagram of a system for performing an exemplary comparison operation according to the present disclosure.

FIG. 1B is a functional block diagram of a comparison system for performing an exemplary comparison operation according to the present disclosure. More specifically, a system 100 can be used to calculate variations in device (e.g., pixel) current based on a comparison of the measured current flowing through one or more pixels (e.g., pixels on a display panel such as the panel 101 described above) and one or more reference currents. The readout system 10 can be similar to the readout system 10 described above with respect to FIG. 1A and can be configured to receive one or more device (e.g., pixel) currents and to compare the received device currents to one or more reference currents. As described above with respect to FIG. 1A, the output of the readout system can then be used by a controller circuit (e.g., the controller 112, not shown in FIG. 1B) to determine how the device current differs from the reference current and adjust the programming voltage for the device accordingly. As will be described in further detail below, the V2I control register 20, the analog output register 30, the digital output register 40, the internal switch matrix address register 50, the external switch matrix address register 60, the mode select register (MODSEL) 70, and the clock manager 80 can act as control registers and/or circuitry, each controlling various settings and/or aspects of the operation of system 100. In certain implementations, these control registers and/or circuitry can be implemented in a controller such as the controller 112 and/or a memory such as the memory 113.

As mentioned above, the readout system 10 can be similar to the readout system 10 described above with respect to FIG. 1A. The readout system 10 can receive device currents from one or more pixels (not shown) via monitor lines (Y1.1-Y1.30) and contains circuitry configured to compare one or more received device currents with one or more reference currents to generate an output signal indicative of the difference between the device and reference currents.

The readout system 10 can include a number of elements including: a switch matrix 11, an analog demultiplexer 12, V2I conversion circuit 13, V2I conversion circuit 14, a switch box 15, a current integrator (CI) 16 and a current comparator (CCMP) 17. The "V2I" conversion circuit refers to a voltage-to-current conversion circuit. The terms circuit, register, controller, driver, and the like are ascribed their meanings as understood by those skilled in the electrical arts. In certain implementations, such as the one shown in FIG. 2, the system 100 can include more than one implementation of the readout system 10. More particularly, FIG. 2 includes 24 such readout systems, ROCH1-ROCH 24, but other implementations can include a different number of implementations of the readout system 10.

It should be emphasized that the exemplary architecture shown in FIG. 1B is not intended to be limiting. For example, certain elements shown in FIG. 1B can be omitted and/or combined. For example, in certain implementations, the switch matrix 11, which selects which of a plurality of monitored currents from a display panel is to be processed by the CI 16 or the CCMP 17, can be omitted from the readout system 10 and instead, can be incorporated into circuitry on a display panel (e.g., the display panel 101).

As mentioned above, the system 100 can be used to calculate variations in device current based on a comparison of the measured current flowing through one or more devices (e.g., pixels) and one or more reference currents. In certain implementations, the readout system 10 can receive device currents via 30 monitor lines, Y1.1-Y1.30, corresponding to pixels in 30 columns of a display (e.g., the display panel 101). The monitor lines Y1.1-Y1.30 can be similar to the monitor lines shown 115, 116 in FIG. 1. Further, it will be understood that the pixels described in this application can include organic light emitting diodes ("OLEDs"). In other implementations, the number of device currents received by a readout system can vary.

After the readout system 10 receives the measured device current or currents to be evaluated, the switch matrix 11 selects from the received signals and outputs them to the analog demultiplexer 12 which then transmits the received signal or signals to either the CI 16 or the CCMP 17 for further processing. For example, if the current flowing through a specific pixel in column 5 is to be analyzed by the readout system 10, a switch address matrix register can be used to connect the monitor line corresponding to column 5 to either the CI 16 or the CCMP 17*m* as appropriate.

Control settings for the switch matrix can be provided by a switch matrix address register. System 100 includes two switch matrix address registers: an internal switch matrix address register 50 and an external switch matrix address register 60. The switch matrix address registers can provide control settings for the switch matrix 11. In certain implementations, only one of the two switch matrix address registers will be active at any given time, depending on the specific settings and configuration of the system 100. More specifically, as described above, in certain implementations, the switch matrix 11 can be implemented as part of the readout system 10. In these implementations, the internal switch matrix address register 50 can be operative to send control signals indicating which of the received inputs is processed by the switch matrix 11. In other implementations, the switch matrix 11 can be implemented as part of the readout system 10. In these implementations, outputs from the internal switch matrix address register 50 can control which of the received inputs is processed by the switch matrix 11.

Timing for operations performed by the readout system 10 can be controlled by clock signals ph1-ph6. These clock signals can be generated by low voltage differential signaling interface register 55. The low voltage differential signaling interface register 55 receives input control signals and uses these signals to generate clock signals ph1-ph6, which as will be described in further detail below, can be used to control various operations performed by the readout system 10.

Each of the readout systems 10 can receive reference voltages, VREF, and bias voltages, VB.x.x. As will be described in further detail below, the reference voltages can be used, for example, by the V2I conversion circuit 13, 14, and the bias voltages, VB.x.x., can be used by a variety of circuitry incorporated in the readout systems 10.

Additionally, both the CI 16 and the CCMP 17 are configured to compare device currents with one or more reference currents, which can be generated by the V2I conversion circuit 13 and the V2I conversion circuit 14, respectively. Each of the V2I conversion circuits 13, 14 receives a voltage and produces a corresponding output current, which is used as a reference current for comparison against a measured current from a pixel circuit in the display. For example, the input voltage to the V2I conversion circuits 13, 14 can be controlled by a value stored in the V2I register 20, thereby allowing control over the reference current value, such as while the device currents are being operated.

A common characteristic of both the CI 16 and the CCMP 17 is that each of them either stores internally in a storage device, such as a capacitor, or presents on an internal conductor or signal line, a difference between the measured device current and one or more reference currents. This difference can be represented inside the CI 16 or the CCMP 17 in the form of a voltage or current or charge commensurate with the difference. How the difference is determined inside the CI 16 or the CCMP 17 is described in more detail below.

In certain implementations, a user can select between the CI 16 and the CCMP 17 based on specific needs, or a controller or other computing device can be configured to automatically select either the CI 16 or the CCMP 17 or both depending on whether one or more criterion is satisfied, such as whether a certain amount of noise is present in the measured sample. For example, because of its specific configuration according to the aspects disclosed herein, CI 16 can offer better noise suppression performance than the CCMP 17, while the CCMP 17 can operate more quickly overall. Because the CI 16 offers better noise performance, the CI 16 can be automatically or manually selected to perform current comparison operations for input signals with high frequency components or a wide range of frequency components. On the other hand, because the CCMP 17 can be configured to perform comparison operations more quickly than the CI 16, the CCMP 17 can be automatically or manually selected to perform current comparison operations for quickly changing input signals (e.g., rapidly changing videos).

According to certain implementations, a V2I conversion circuit in a specific readout system 10 can be selected based on the outputs of the V2I control register 20. More specifically, one or more of the V2I conversion circuits 13, 14 in a given readout system 10 (selected from a plurality of similar readout systems) can be activated based on the configuration of and control signals from the control register 20.

As will be described in more detail below, both the CI 16 and the CCMP 17 generate outputs indicative of the difference between the device current or currents received by the switch matrix 11 and one or more reference currents, generated by the V2I conversion circuits 13 and 14, respectively. In certain implementations, the output of the CCMP 17 can be a single-bit quantized signal. The CI 16 can be configured to generate either a single-bit quantized signal or an analog signal which can then be transmitted to a multibit quantizer for further processing.

Unlike prior systems which merely performed multibit quantization on a measured device current, without comparing the device current to a known reference current or performing further processing on signals indicative of the difference between a device current and a known reference current, the disclosed systems perform quantization operations reflecting the difference between a measured device current and a known reference current. In certain implementations, a single-bit quantization is performed, and this quantization allows for faster and more accurate adjustment of device currents to account for shifts in threshold voltage, other aging effects, and the effects of manufacturing non-uniformities. Optionally, in certain implementations, a multibit quantization can be performed, but the disclosed multibit quantization operations improve upon previous quantization operations by quantizing a processed signal indicative of the difference between the measured device current and the known reference current. Among other benefits, the disclosed multibit quantization systems offer better noise performance and allow for more accurate adjustment of device parameters than previous multibit quantization systems.

Again, as mentioned above, a common feature of the CI 16 and the CCMP 17 is that each of these circuits either stores internally in a storage device, such as a capacitor, or presents on an internal conductor or signal line, a difference between the measured device current and one or more reference currents. Stated differently, the measured device current is not merely quantized as part of a readout measurement, but rather, in certain implementations, a measured device current and a known reference current are subtracted inside the CI 16 or CCMP 17, and then the resulting difference between the measured and reference currents is optionally amplified then presented to a single-bit quantizer as an input.

The digital readout register 40 is a shift register that processes digital outputs from either the CI 16 or the CCMP 17. According to certain implementations, the processed output is a single-bit quantized signal generated by the CI 16 or the CCMP 17. More specifically, as described above, both the CI 16 and the CCMP 17 can generate single-bit outputs indicating how a measured current deviates from a reference current (i.e., whether the measured current is larger or smaller than the reference current). These outputs are transmitted to digital readout register 40 which can then transfer the signals to a controller (e.g., the controller 112) containing circuitry and or computer algorithms configured to quickly adapt the programming values to the affected pixels so that the degradation or non-uniformity effects can be compensated very quickly. In certain implementations, the digital readout register 40 operates as a parallel-to-serial converter which can be configured to transfer the digitized output of a plurality of the readout systems 10 to a controller (e.g., the controller 112) for further processing as described above.

As mentioned above, in certain implementations, instead of generating a single-bit digital output, the readout system 10 can generate an analog output indicative of the difference between a device current and a reference current. This analog output can then be processed by a multibit quantizer (external to the readout system 10) to generate a multibit quantized output signal which can then be used to adjust device parameters as necessary. Unlike prior systems which merely performed multibit quantization on a potentially noisy measured device current, processing on signals indicative of the difference between a device current and a known reference current, these prior systems were slower than and not as reliable as the currently disclosed systems.

Analog output register 30 is a shift register that that processes an analog output from the readout system 10 before transmitting the output to a multibit quantizer (e.g., a quantizer implemented in controller 112). More specifically, the analog output register 30 controls a multiplexer (not shown) that allows one of a number of the readout systems 10 to drive analog outputs of System 100 which can then be transmitted to a multibit quantizer (e.g., a quantizer contained in the controller 112) for further processing.

Quantizing the difference between the measured and reference currents reduces the number of iterations and over- and under-compensation that occurred in previous compensation techniques. No longer does the compensation circuitry merely operate on a quantized representation of a measured device current. As will be described in further detail below, a single-bit quantization as described herein allows for faster and more accurate adjustment of device currents to account for shifts in threshold voltage and other aging effects. Further, in certain implementations, a multibit quantization can be performed, but the disclosed multibit quantization operations improve upon previous quantization operations by quantizing a processed signal indicative of the difference between the measured device current and the known reference current. This type of quantization offers better noise performance and allows for more accurate adjustment of device currents than previous multibit quantization systems.

The MODSEL 70 is a control register that can be used to configure the system 200.

More specifically, in certain implementation, the MODSEL 70 can output control signals that, in conjunction with the clock manager, can be used to program the system 200 to operate in one or more selected configurations. For example, in certain implementations, a plurality of control signals from the MODSEL register 70 can be used, for example, to select between CCMP and CI functionality (based on, for example, whether high-speed or low-noise performance is prioritized), enable slew correction, to enable V2I conversion circuits, and/or to power down the CCMP and CI. In other implementations, other functionality can be implemented.

Figure 2:
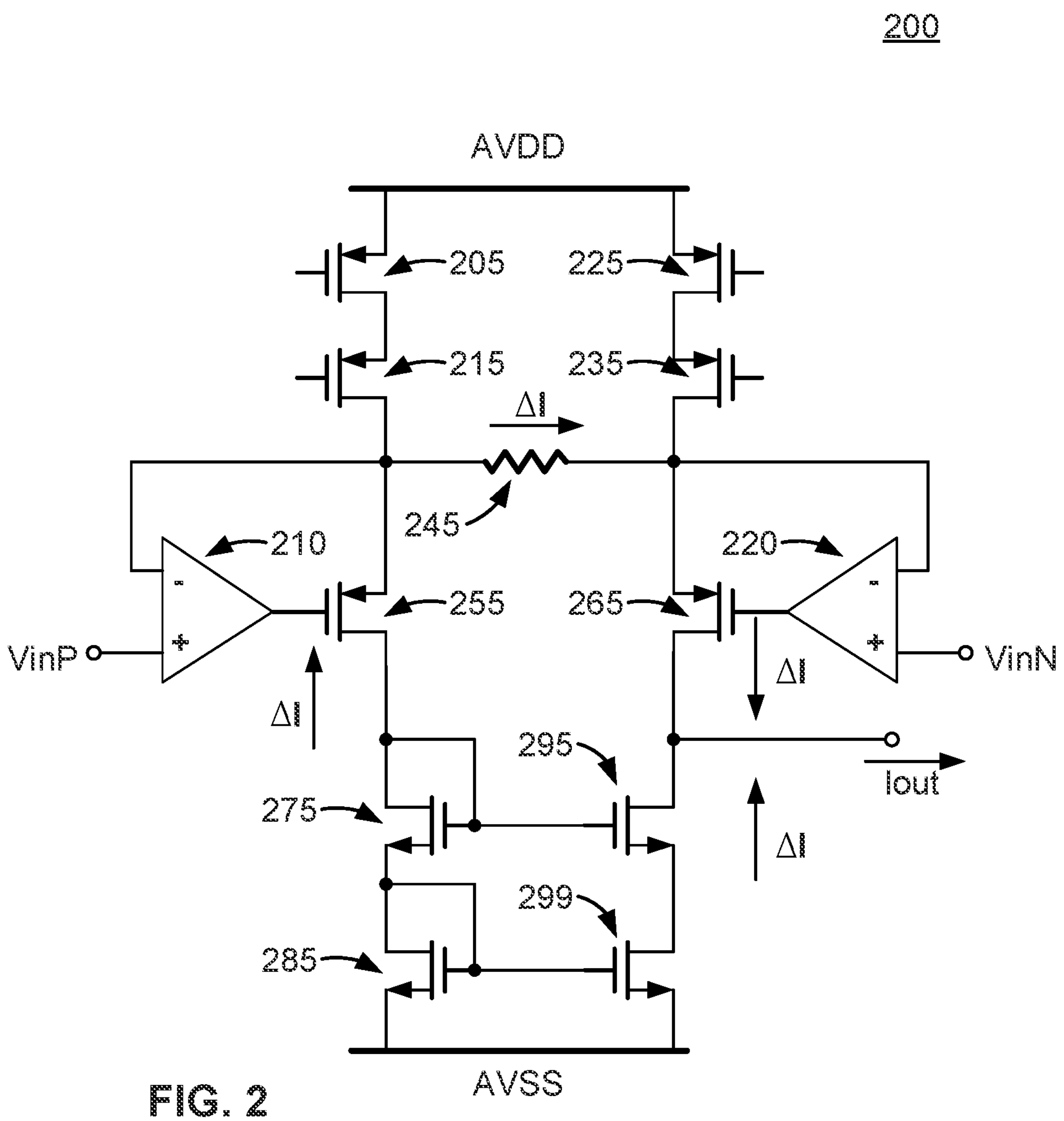
FIG. 2 illustrates, in a schematic, a circuit model of a voltage to current (V2I) conversion circuit 200 according to the present disclosure.

FIG. 2 illustrates, in a schematic, a circuit model of a voltage to current (V2I) conversion circuit 200, which is used to generate a reference current based on an adjustable or fixed input voltage. The V2I conversion circuit 200 can be similar to the V2I conversion circuits 13 and 14 described above with respect to FIG. 1. More specifically, the V2I conversion circuit 200 can be used to generate a specified reference current based on one or more input currents and/or voltages. As discussed above, the current comparators and current integrators disclosed herein compare measured device currents to these generated reference currents to determine how the reference and device currents differ and to adjust device parameters based on these differences between the currents. Because the reference current generated by the V2I conversion circuit 200 is easily controlled, the V2I conversion circuit 200 can generate very accurate reference current values, specified to account for random variations or non-uniformities during the fabrication process of the display pane The V2I conversion circuit 200 includes two operational transconductance amplifiers, 210 and 220. As shown in FIG. 2, the amplifier 210 and the amplifier 220 each receive an input voltage ($V_{inP}$ and $V_{inN}$, respectively), which is then processed to generate a corresponding output current. In certain implementations, the output current can be used as a reference current, $I_{Ref}$, by current comparators and/or current integrators such as CI 16 and/or CCMP 17 described herein. By characterizing each V2I conversion circuit with a reference operational trans-resistance or trans-conductance amplifier, each V2I conversion circuit, depending upon its physical location relative to the display panel, can be digitally calibrated to compensate for random variations or non-uniformities during the fabrication process of the display panel. The integrated resistor 245, is shown in FIG. 2.

More specifically, through the use of feedback loops, the amplifier 210 and the amplifier 220 create virtual ground conditions at nodes A and B, respectively. Further, the transistors 205 and 215 are matched to provide a first constant DC current source, while the transistors 225 and 235 are matched to provide a second constant DC current source. The current from the first source flows into node A, while the current from the second source flows into node B.

Because of the virtual ground condition at nodes A and B, the voltage across the resistor 245 is equal to the voltage difference between $V_{inP}$ and $V_{inN}$. Accordingly, a current, $deltaI=(V_{inP}-V_{inN})/R_{Ref}$, flows through the resistor 245. This creates an imbalanced current through P-type transistors 255 and 265. The displaced current through the transistor 255 is then sunk into the current mirror structure of the transistors 275, 285, 295, and 299 to match the current through the transistor 265. As shown in FIG. 2, the matched current, however, is in the opposite direction of the current through transistor 265, and therefore the output current, $I_{out}$, of the V2I conversion circuit 200 is equal to $2\ deltaI=2(V_{inP}-V_{inN})/R_{Ref}$. By appropriately choosing values for input voltages $V_{inP}$ and $V_{inN}$ and for the resistor 245, a user of the circuit can easily control the generated output current, $I_{out}$.

Figure 3:
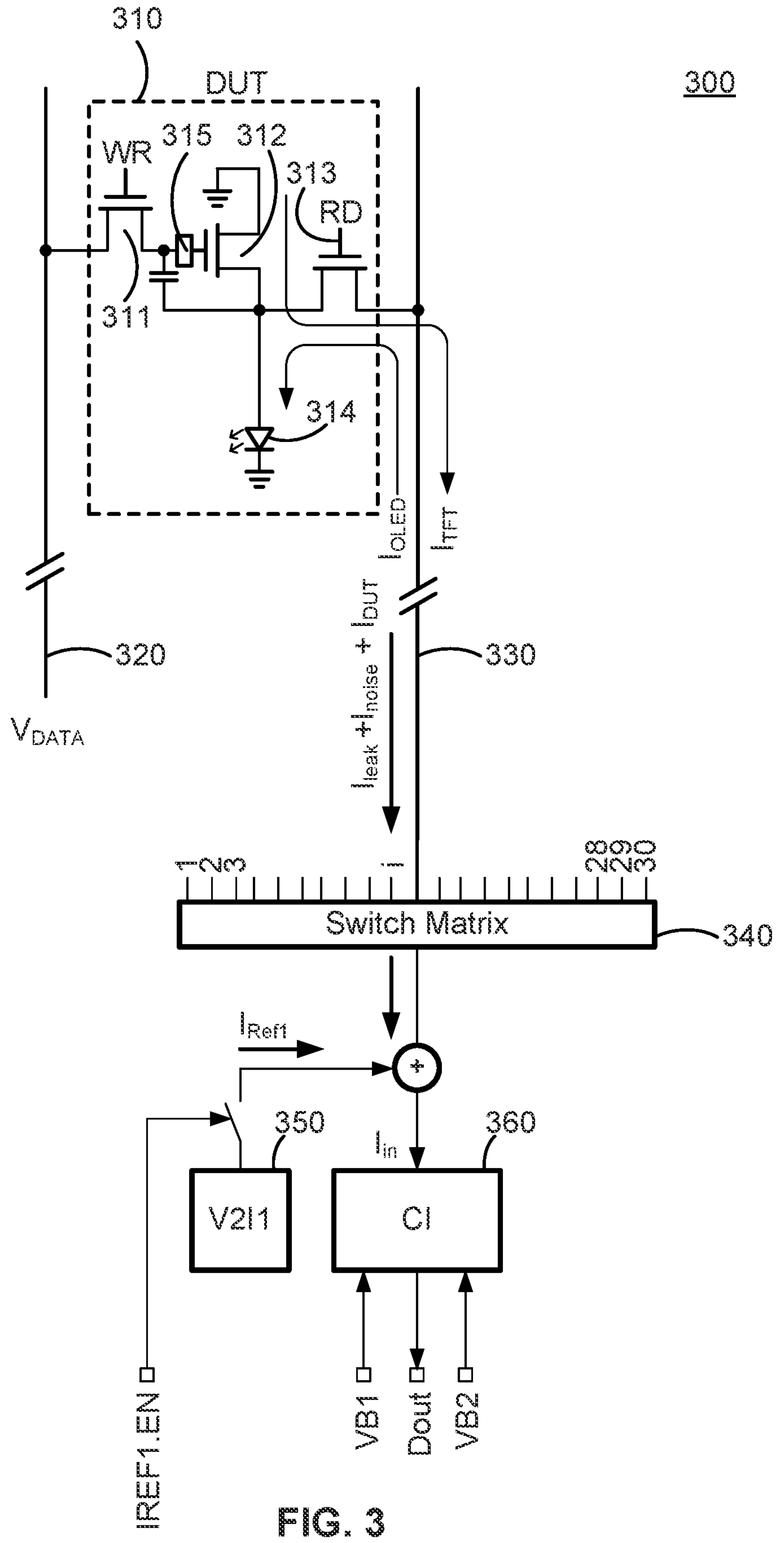
FIG. 3 illustrates a block diagram of a system configured to perform a current comparison operation using a current integrator according to the present disclosure.

FIG. 3 illustrates a block diagram showing an exemplary system configured to perform a device current comparison using a current integrator. The device current comparison can be similar to device current comparisons described above. More specifically, using the system illustrated in FIG. 3, a current integrator (optionally integrated in a readout system such as readout system 10) can evaluate the difference between a device current and a reference current. The device current can include the current through a driving transistor of a pixel ($I_{TFT}$) and/or the current through the pixel's light emitting device ($I_{OLED}$). The output of the current integrator can be sent to a controller (not shown) and used to program the device under test to account for shifts in threshold voltage, other aging effects, and/or manufacturing non-uniformities. In certain implementations, the current integrator can receive input current from a monitor line coupled to a pixel of interest over two phases. In one phase, current flowing through the pixel of interest, along with monitor line leakage current and noise current can be measured. In the other phase, the pixel of interest is not driven, but the current integrator still receives monitor line leakage current and noise current from the monitor line. Additionally, a reference current is input to the current integrator during either the first phase or the second phase. Voltages corresponding to the received currents are stored during each phase. The voltages corresponding to the currents from the first and second phases are then subtracted leaving only the a voltage corresponding to the difference between the device current and the reference current for use in compensating for non-uniformities and/or degradation of that device (e.g., pixel) circuit. In other words, the presently disclosed current comparators use a two-phase readout procedure to eliminate the effect of leakage currents and noise currents while achieve a highly accurate measurement of the device current, which is then quantified as a difference between the measured current (independent of leakage and noise currents) and a reference current. This two-phase readout procedure can be referred to as correlated-double sampling. The quantified difference is highly accurate and can be used for accurate and fast compensation of non-uniformities and/or degradation. Because the actual difference between the measured current of a pixel circuit, untarnished by leakage or noise currents inherent in the readout, is quantified, any non-uniformities or degradation effects can be quickly compensated for by a compensation scheme.

System 300 includes a pixel device 310, a data line 320, a monitor line 330, a switch matrix 340, a V2I conversion circuit 350 and a current integrator (CI) 360. The pixel device 310 can be similar to the pixel 104, the monitor line 330 can be similar to the monitor lines 115, 116, the V2I conversion circuit 350 can be similar to the V2I conversion circuit 200, and the CI 360 can be similar to the CI 16.

As shown in FIG. 3, pixel device 310 includes a write transistor 311, a drive transistor 312, a read transistor 313, light emitting device 314, and storage element 315. The storage element 315 can optionally be a capacitor. In certain implementations, the light emitting device (LED) 314 can be an organic light emitting device (OLED). Write transistor 311 receives programming information from data line 320 which can be stored on the gate of the drive transistor 312 (e.g., using a "WR" control signal) and used to drive current through the LED 314. When the read transistor 313 is activated (e.g., using a "RD" control signal), the monitor line 330 is electrically coupled to the drive transistor 312 and the LED 314 such that current from the LED and/or drive transistor can be monitored via the monitor line 330.

More specifically, when the read transistor is activated (e.g., via a "RD" control signal), CI 360 receives input current from the device 310 via monitor line 330. As described above with respect to FIG. 1, a switch matrix, such as the switch matrix 340, can be used to select which received signal or signals to transmit to CI 360. In certain implementations, the switch matrix 340 can receive currents from 30 monitored columns of a display panel (e.g., display panel 101) and select which of the monitored columns to transmit to the CI 360 for further processing. After receiving and processing the currents from the switch matrix 340, the CI 360 generates a voltage output, Dout, indicative of the difference between the measured device current and the reference current generated by the V2I conversion circuit 350.

The V2I conversion circuit 350 can optionally be turned on and/or off using control signal IREF1.EN. Additionally, bias voltages VB1 and VB2 can be used to set a virtual ground condition at the inputs of CI 360. In certain implementations, VB1 can be used to set the voltage level at an input node receiving input current $I_{in}$, and VB2 can be used as an internal common mode voltage.

In certain implementations, a current readout process to generate an output indicative of the differences between measured device currents and one or more reference currents while minimizing the effects of noise can occur over two phases. The generated output can be further processed by any current integrator or current comparator disclosed herein.

During a first phase of a first current readout implementation, the V2I conversion circuit 350 is turned off, so no reference current flows into the CI 360. Additionally, a pixel of interest can be driven such that current flows through the drive transistor 312 and the LED 314 incorporated into the pixel. This current can be referred to as $I_{device}$. In addition to $I_{device}$, monitor line 330 carries leakage current $I_{leak1}$ and a first noise current, $I_{noise1}$.

Therefore, the input current to the CI 360 during the first phase of this current readout implementation, $I_{in\_phase1}$, is equal to:

$$I_{device}+I_{leak}+I_{noise1}$$

After the first phase of the current readout implementation is complete, an output voltage corresponding to $I_{in\_phase1}$ is stored inside the CI 360. In certain implementations, the output voltage can be stored digitally. In other implementations, the output voltage can be stored in analog form (e.g., in a capacitor).

During the second phase of the first current readout implementation, the V2I conversion circuit 350 is turned on, and a reference current, $I_{Ref}$, flows into CI 360. Further, unlike the first phase of this current readout implementation, the pixel of interest coupled to the monitor line 330 is turned off. Therefore, the monitor line 330 now carries leakage current $I_{leak}$ and a second noise current, $I_{noise2}$ only. The leakage current during the second phase of this readout $I_{leak}$, is assumed to be roughly the same as the leakage current during the first phase of the readout because the structure of the monitor line does not change over time.

Accordingly, the input current to the CI 360 during the second phase of this current readout implementation, $I_{in\_phase2}$, is equal to:

$$I_{Ref}+I_{leak}+I_{noise2}$$

After the second phase of the current readout process is complete, the outputs of the first phase and the second phase are subtracted using circuitry incorporated inside the CI 360 (e.g., a differential amplifier) to generate an output voltage corresponding to the difference between the device currents and the reference currents. More specifically, the output voltage of the circuitry performing the subtraction operation is proportional to:

$$I_{in\_phase1}-I_{in\_phase2}=(I_{device}+I_{leak}-I_{noise1})-(I_{Ref}+I_{leak}+I_{noise2})=I_{device}-I_{Ref}+I_{noise}.$$

$I_{noise}$ is typically high frequency noise, and its effects are minimized or eliminated by a current integrator such as the CI 360. The output voltage of the circuitry performing the subtraction operation in the second readout process can then be amplified, and the amplified signal can then be processed by a comparator circuit incorporated in the CI 360 to generate a single-bit quantized signal, Dout, indicative of a difference between the measured device current and the reference current. For example, in certain implementations, Dout can be equal to"1" if the device current is larger than the reference current and equal to"0" if device current is less than or equal to the reference current. The amplification and quantization operations will be described in further detail below.

Table 1 summarizes the first implementation of a differential current readout operation using a CI 360 as described above. In Table 1, "RD" represents a read control signal coupled to the gate of the read transistor 313.

TABLE 1

CI Single-ended Current Readout-First Implementation

| | Sample 1 | Sample 2 |
|---|---|---|
| RD | ON | OFF |
| $I_{device}$ | $I_{TFT}/I_{OLED}$ | 0 |
| $I_{Mon}$ | $I_{device} + I_{leak} + I_{noise1}$ | $I_{leak} + I_{noise2}$ |
| $I_{REF}$ | 0 | $I_{Ref}$ |
| Input Current | $I_{device} + I_{leak} + I_{noise1}$ | $I_{Ref} + I_{leak} + I_{noise2}$ |

A second implementation of a current readout operation using the CI 360 also takes place over two phases. During a first phase of the second implementation, the V2I conversion circuit 350 is configured to output a negative reference current, $-I_{Ref}$. Because a negative reference current, $-I_{Ref}$, is provided to the CI 360 in the second implementation, the second implementation requires circuitry in the CI 360 to operate over a lower dynamic range of input currents than the first implementation described above. Additionally, as with the first implementation described above, a pixel of interest can be driven such that current flows through the pixel's drive transistor 312 and LED 314. This current can be referred to as $I_{device}$. In addition to $I_{device}$, monitor line 330 carries leakage current $I_{leak}$ and a first noise current, $I_{noise1}$.

Therefore, the input current to the CI 360 during the first phase of the second implementation of the current readout process, $L_{in\_phase1}$, is equal to:

$$I_{device}-I_{Ref}+I_{leak}+I_{noise1}$$

As discussed above, a voltage corresponding to the input current is stored in either analog or digital form inside the CI 360 after the first phase of a current readout process completes and during a second phase of the current readout process.

During the second phase of the second implementation of the current readout process, the V2I conversion circuit 350 is turned off so no reference current flows into the CI 360. Further, unlike the first phase of the second implementation, the pixel of interest coupled to the monitor line 330 is turned off. Therefore, the monitor line 330 only carries leakage current $I_{leak}$ and a second noise current, $I_{noise2}$.

Accordingly, the input current to the CI 360 during the second phase of the second implementation of the current readout process, $I_{in\_phase2}$, is equal to:

$$I_{leak}+I_{noise2}.$$

After the second phase of the current readout process is complete, the outputs of the first phase and the second phase are subtracted using circuitry incorporated inside the CI 360 (e.g., a differential amplifier) to generate an output voltage corresponding to the difference between the device currents and the reference currents. More specifically, the output voltage of the circuitry performing the subtraction operation is proportional to:

$$I_{in\_phase1}-I_{in\_phase2}=(I_{device}-I_{Ref}+I_{leak}+I_{noise1})-(I_{Ref}+I_{leak}+I_{noise2})=I_{device}-I_{Ref}+\text{Inoise}.$$

Like the first readout process described above, the output voltage of the circuitry performing the subtraction operation in the second readout process can then be amplified, the amplified signal can then be processed by a comparator circuit incorporated in the CI 360 to generate a single-bit quantized signal, Dout, indicative of a difference between the measured device current and the reference current. The amplification and quantization operations will be described in further detail below with respect to FIGS. 4-6.

Table 2 summarizes the second implementation of a current readout process using a CI 360 in a second implementation as described above. In Table 2, "RD" represents a read control signal coupled to the gate of the read transistor 313.

TABLE 2

CI Current Readout Process-Second Implementation

| | Sample 1 | Sample 2 |
|---|---|---|
| RD | ON | OFF |
| $I_{device}$ | $I_{TFT}/I_{OLED}$ | 0 |
| $I_{Mon}$ | $I_{device} + I_{leak} + I_{noise1}$ | $I_{leak} + I_{noise2}$ |
| $I_{REF1}$ | $-I_{Ref}$ | 0 |
| Input current | $I_{device} - I_{Ref} + I_{leak} + I_{noise1}$ | $I_{leak} + I_{noise2}$ |

Figure 4:
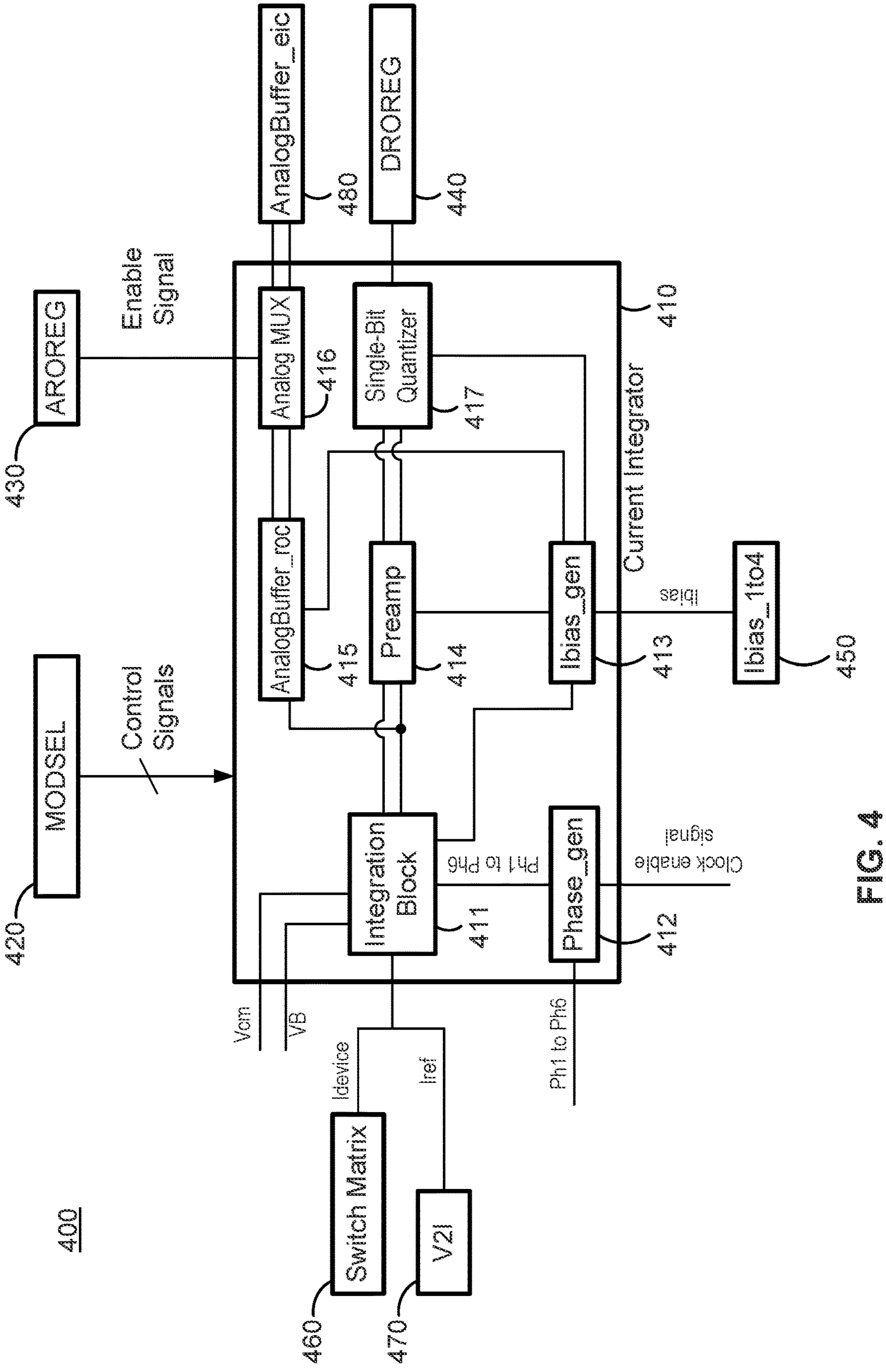
FIG. 4 illustrates another block diagram of a system configured to perform a current comparison operation using a current integrator according to the present disclosure.

FIG. 4 illustrates another block diagram of a system configured to perform a device current comparison using a current integrator according to the present disclosure. Current Integrator (CI) 410 can, for example, be similar to the CI 16 and/or the CI 300 described above. Configuration settings for the CI 410 are provided by a mode select register, the MODSEL 420, which can be similar to the MODSEL 70 described above.

Like the CI 16 and the CI 360, the CI 410 can be incorporated into a readout system (e.g., the readout system 10) and evaluate the difference between a device current (e.g., a current from a pixel of interest on a display panel) and a reference current. In certain implementations the CI 410 can output a single-bit quantized output indicative of the difference between the device current and the reference current. In other implementations, the CI 410 can generate an analog output signal which can then be quantized by an external multibit quantizer (not shown). The quantized output (from the CI 410 or from the external multibit quantizer) be output to a controller (not shown) configured to program the measured device (e.g., the pixel of interest) to account for shifts in threshold voltage, other aging effects, and the effects of manufacturing non-uniformities.

The integration circuit 411 can receive a device current, $I_{device}$, from the switch matrix 460 and a reference current from the V2I conversion circuit 470. The switch matrix can be similar to the switch matrix 11 described above, and the V2I conversion circuit 470 can be similar to V2I conversion circuit 200 described above. As will be described in further detail below, the integration circuit 411 performs an integration operation on the received currents, to generate an output voltage indicative of the difference between the device current and the reference current. Readout timing for the integration circuit 411 is controlled by a clock signal control register, Phase_gen 412, which provides clock signals Ph1 to Ph 6 to the integrator block 411. The clock signal control register, Phase_gen 412 is enabled by an enable signal, GlobalCLEn. Readout timing will be described in more detail below. Further, power supply voltages for the integration circuit 411 are provided via power supply voltage lines $V_{cm}$ and $V_B$.

As mentioned above, in certain implementations, the CI 410 can output a single-bit quantized output indicative of the difference between the device current and the reference current. In order to generate the single-bit output, the output voltage of the integration circuit 411 is fed to the preamp 414, and the amplified output of the preamp 414 is then sent to the single-bit quantizer 417. The single-bit quantizer 417 performs a single-bit quantization operation to generate a binary signal indicative of the difference between the received device and reference currents.

In other implementations, the CI 410 can generate an analog output signal which can then be quantized by an external multibit quantizer (not shown). In these implementations, the output of the integrator circuit 411 is transmitted to a first analog buffer, the AnalogBuffer_Roc 415, instead of Comparator 416. The output of the first analog buffer, AnalogBuffer_Roc 415, is transmitted to an analog multiplexer, Analog MUX 416, which then sends its output serially to a second analog buffer, the AnalogBuffer_eic 480, using analog readout shift registers (not shown). The second analog buffer, AnalogBuffer_eic 480, can then transfer the output to a multibit quantizer circuit (not shown) for quantization and further processing. As mentioned above, the quantized output can then be output to a controller (not shown) configured to program the measured device (e.g., the pixel of interest) to account for shifts in threshold voltage, other aging effects, and the effects of manufacturing non-uniformities. Control signals for the analog multiplexer, Analog MUX 416, are provided by the control register AROREG 430.

Figure 5:
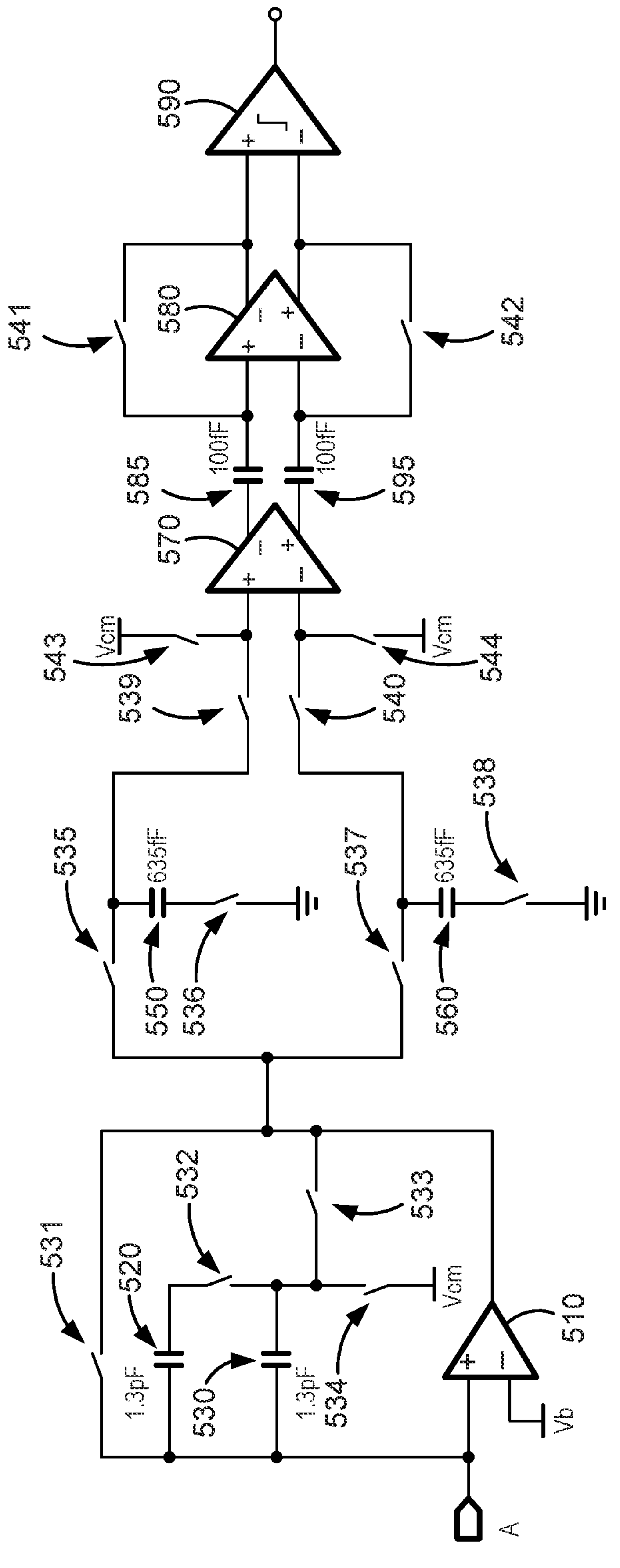
FIG. 5 illustrates a circuit diagram of a system configured to generate a single bit output based on the output of a current integrator according to the present disclosure.

FIG. 5 illustrates, in a schematic, a circuit diagram of a current integrator system configured to perform a device current comparison according to the present disclosure. More specifically, the system 500 can receive a device current from a device current of interest and a reference current and generate a voltage indicative of the difference between a device current and a reference current. This voltage can then be presented as an input voltage to a quantizer as disclosed herein. The system 500 can be similar to the CI 16 and the CI 410 described above. In certain implementations, the system 500 can be incorporated into the readout system 10 described above with respect to FIG. 1.

The System 500 includes an integrating opamp 510, a capacitor 520, a capacitor 530, switches 531-544, a capacitor 550, a capacitor 560, a capacitor 585, a capacitor 595, an opamp 570, an opamp 580, and a comparator 590. Each of these components will be described in further detail below. While specific capacitance values for the capacitors 530, 550, 560 are shown in the implementation of FIG. 5, it will be understood that in other implementations, other capacitance values can be used. As will be described below, in certain implementations, System 500 can perform a comparison operation over six phases. In certain implementations, two of these six phases correspond to the readout phases described above with respect to FIG. 3. Three of the six phases are used to reset circuit components and account for noise and voltage offsets. During the final phase of the comparison operation, the system 500 performs a single bit quantization. A timing diagram of the comparison operation will be described with respect to FIG. 7 below.

During the first phase of the comparison operation, the integrating opamp 510 is reset to a known state. Resetting the integrating opamp 510 allows the integrating opamp 510 to be set to a known state and allows noise or leakage current from previous operations to settle before integrating opamp 510 performs an integration operation on input currents during the second phase of the readout operation. More specifically, during the first phase of the comparison operation, the switches 531, 532, and 534 are closed, effectively configuring the integrating opamp 510 into a unity gain configuration. In a particular implementation, the capacitor 520 and the capacitor 530 are charged to voltage $V_b+V_{offset}+V_{cm}$, and the input voltage at input node A is set to $V_b+V_{offset}$ during this first phase of the comparison operation. $V_B$ and $V_{cm}$ are DC-power supply voltages supplied to the integrating opamp 510. Similarly, $V_{offset}$ is a DC offset voltage supplied to the integrating opamp 510 to bias the integrating opamp 510 correctly.

During the second phase of the comparison operation, the integrating opamp 510 can perform an integration operation on a received reference current, $I_{Ref}$, a device current $I_{device}$, and a monitor line leakage current $I_{leakage}$. This phase of the current operation can be similar to the first phase of the second current readout implementation described above with respect to FIG. 3. Switches 532, 533, and 535 are closed, providing a path for charge stored in the capacitors 520 and 530 to the storage capacitor 550. The effective integration current of the second phase (Iint1) is equal to $Iint1=I_{device}-I_{Ref}+I_{leakage}$. The output voltage of the integrating opamp 510 during this phase is $V_{int1}=(I_{int1}/C_{int})*t_{int}+V_{cm}$, where $C_{int}$=the sum of the capacitance values of the capacitor 520 and capacitor 530, and $t_{int}$ is the time over which the current is processed by the integrating opamp 510. The output voltage $V_{int1}$ is stored on Capacitor 550.

During the third phase of the comparison operation, the integrating opamp 510 is again reset to a known state. Resetting the integrating opamp 510 allows the integrating opamp 510 to be set to a known state and allows noise or leakage current from previous operations to settle before integrating opamp 510 performs an integration operation on input currents during the fourth phase of the readout operation.

During the fourth phase of the comparison operation, the integrating opamp 510 performs a second integration operation. This time, however, only the monitor line leakage current is integrated. Therefore, the effective integration current during the fourth phase is $I_{int2}=I_{leakage}$. This phase of the current operation can be similar to the first phase of the second current readout implementation described above with respect to FIG. 3. The output voltage of the integrating opamp 510 during this phase is $V_{int2}=(I_{int2}/C_{int})*t_{int}+V_{cm}$. As described above, $t_{int}$ is the time over which the current is processed by the integrating opamp 510. Switch 537 is closed and switch 535 is open during this phase, so the output voltage $V_{int2}$ of the integrating opamp 510 for fourth phase is stored on Capacitor 560.

During the fifth phase of the comparison operation, the output voltages of the two integration operations are amplified and subtracted to generate an output voltage indicative of the difference between the measured device current and the reference current. More specifically, in this phase, the outputs of the capacitors 550 and 560 are transmitted to the first amplifying opamp 570. The output of the first amplifying opamp 570 is then transmitted to the second amplifying opamp 580. The opamps 570 and 580 amplify the inputs from Capacitors 550 and 560, and the differential input voltage to the capacitors is described by the following equation:

$$V_{diff}=V_{int1}-V_{int2}=(t_{int}/C_{int})*(I_{int1}-I_{int2})=(t_{int}/C_{int})*I_{device}-I_{Ref}.$$

The use of multiple opamps (i.e., the opamps 570 and 580) allows for increased amplification of the inputs from the capacitors 550 and 560. In certain implementations, the opamp 580 is omitted. Further, the opamps 570 and 580 are calibrated during the fourth phase of the readout operation, and their DC offset voltages are stored on the capacitors 585 and 595 prior to the start of the fifth phase in order to remove offset errors.

During the optional sixth phase of the comparison operation, if the integrator is configured to perform single bit quantization, the quantizer 590 is enabled and performs a quantization operation on the output voltage of the opamps 570 and/or 580. As discussed above, this output voltage is indicative of the difference between the measured device current and the reference current. The quantized signal can then be used by external circuitry (e.g., the controller 112) to determine how the device current differs from the reference current and to adjust the programming voltage for the device of interest accordingly. In certain implementations, the sixth phase of the readout operation does not begin until input and output voltages of Opamps 570 and 580 have settled.

The currents applied to the integrating opamp 510 during the second and fourth stages of the comparison operation described above can be similar to the currents applied during the first and second phases, respectively, of the current readout operation described above and summarized in Tables 1 and 2. As described above, inputs applied during the phases of a current readout operation can vary and occur in different orders. That is, in certain implementations, different inputs can be applied to the integrating opamp 510 during the first and second phases of a current readout operation (e.g., as described in Tables 1 and 2). Further, in certain implementations, the order of inputs during the first and second phases of a current readout operation can be reversed.

Figure 6:
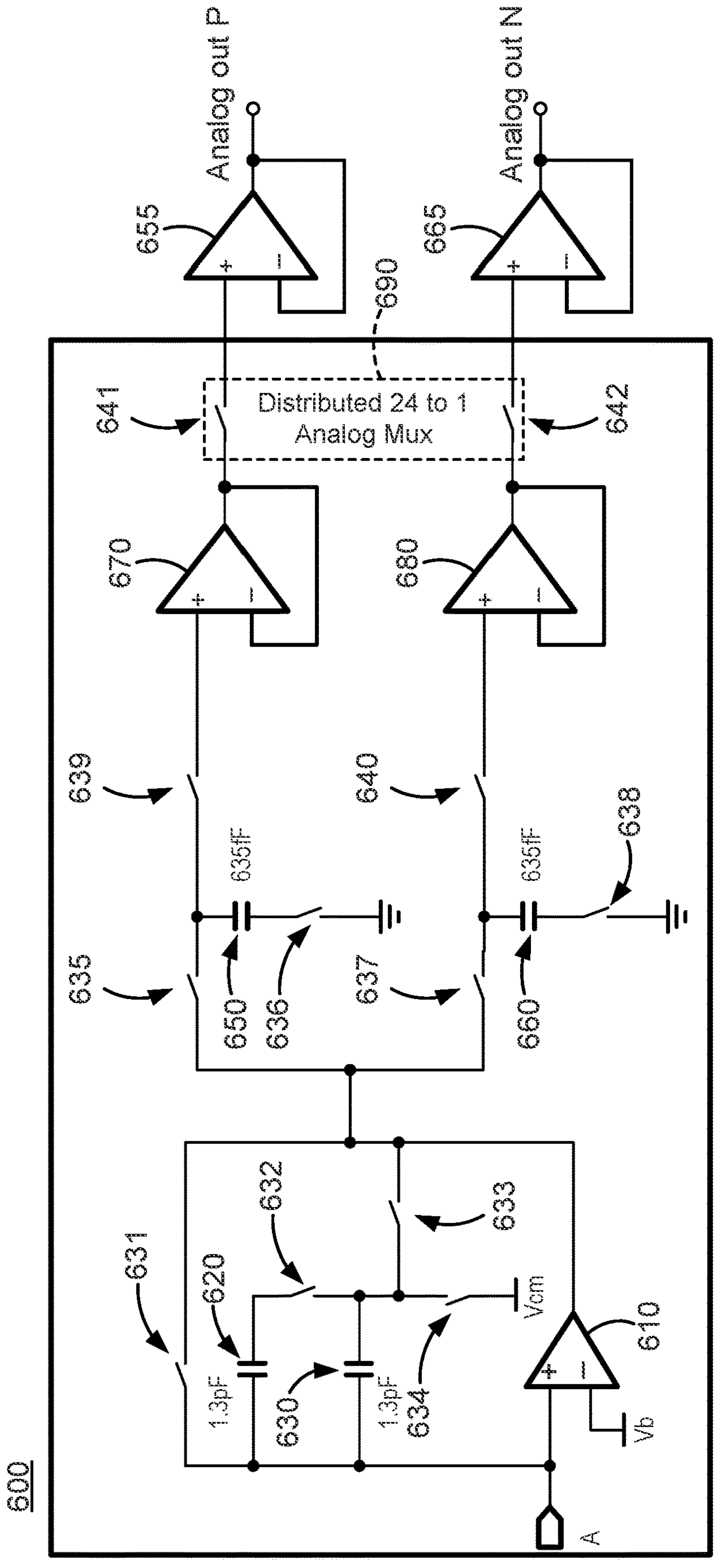
FIG. 6 illustrates a circuit diagram of a system configured to generate a multibit output based on the output of a current integrator according to the present disclosure.

FIG. 6 illustrates a circuit diagram of a current integrator system configured to generate a multibit output indicative of the difference between a device current and a reference current according to the present disclosure. The system 600 is similar to the circuit 500 above, except it includes circuitry configured to generate analog outputs that can be operated on by a multibit quantizer. More specifically, the system 600 can receive a device current from a device current of interest and a reference current and generate a voltage indicative of the difference between a device current and a reference current. This voltage can then be presented as an input voltage to a quantizer as disclosed herein. Unlike the system 500, the quantizer associated with the system 600 performs a multibit quantization and is located in circuitry external to the current integrator system 600. In certain implementations, the system 600 can be incorporated into the readout system 10 described above with respect to FIG. 1.

More specifically, the system 600 includes an integrating opamp 610, a capacitor 620, a capacitor 630, switches 631-642, a capacitor 650, a capacitor 660, an analog buffer 670, an analog buffer 680, an analog multiplexer 690, an analog buffer 655, and an analog buffer 665. While specific capacitance values for Capacitors 620, 630, 650, and 660 are shown in the implementation of FIG. 6, it will be understood that in other implementations, other capacitance values can be used. Further, while Analog Multiplexer 690 is shown as a 24-to-1 Multiplexer (corresponding to 24 Readout Channels), in other implementations, other types of Analog Multiplexers can be used. Each of these components will be described in further detail below.

In certain implementations, the system 600 can perform a comparison operation over six phases, which can be similar to the six phases described above with respect to FIG. 5. Unlike the comparison operation described with respect to FIG. 5, however, in certain implementations, in order to enable multibit quantization, clock signals controlling the timing of the fifth and sixth phases in the comparison operation of FIG. 5 remain low after the fourth phase of the comparison operation of FIG. 6.

As mentioned above, the first four phases of the comparison operation can be similar to those described above with respect to FIG. 5, in which the system 500 is configured to perform single bit integration. More specifically, during the first phase of the comparison operation, the integrating opamp 610 is reset to a known state. Resetting the integrating opamp 610 allows the integrating opamp 610 to be set to a known state and allows noise or leakage current from previous operations to settle before integrating opamp 610 performs an integration operation on input currents during the second phase of the readout operation. More specifically, during the first phase of the comparison operation, the switches 631, 632, and 634 are closed, effectively configuring the integrating opamp 510 into a unity gain configuration. In a particular implementation, the capacitor 620 and the capacitor 630 are charged to voltage $V_b+V_{offset}+V_{cm}$, and the input voltage at input node A is set to $V_b+V_{offset}$ during this first phase of the comparison operation. $V_B$ and $V_{cm}$ are DC-power supply voltages supplied to the integrating opamp 610. Similarly, $V_{offset}$ is a DC offset voltage supplied to the integrating opamp 610 to bias the integrating opamp 510 correctly.

During the second phase of the comparison operation, the integrating opamp 610 can perform an integration operation on a received reference current, $I_{Ref}$, a device current $I_{device}$, and a monitor line leakage current $I_{leakage}$. This phase of the current operation can be similar to the first phase of the second current readout implementation described above with respect to FIG. 3. Switches 632, 633, and 635 are closed, providing a path for charge stored in the capacitors 620 and 630 to the storage capacitor 650. The effective integration current of the second phase (Iint1) is equal to $Iint1=I_{device}-I_{Ref}-I_{leakage}$. The output voltage of the integrating opamp 610 during this phase is $V_{int1}=(I_{int1}/C_{int})*t_{int}+V_{cm}$, where $C_{int}$=the sum of the capacitance values of the capacitor 620 and capacitor 630, and $t_{int}$ is the time over which the current is processed by the integrating opamp 610. The output voltage $V_{int1}$ is stored on Capacitor 650.

During the third phase of the comparison operation, the integrating opamp 610 is again reset to a known state. Resetting the integrating opamp 610 allows the integrating opamp 610 to be set to a known state and allows noise or leakage current from previous operations to settle before integrating opamp 510 performs an integration operation on input currents during the fourth phase of the readout operation.

During the fourth phase of the comparison operation, the integrating opamp 510 performs a second integration operation. This time, however, only the monitor line leakage current ($I_{leakage}$) is integrated. Therefore, the effective integration current during the fourth phase ($I_{int2}$) is $I_{int2}=I_{leakage}$. This phase of the current operation can be similar to the first phase of the second current readout implementation described above with respect to FIG. 3. The output voltage of the integrating opamp 510 during this phase is $V_{int2}=(I_{int2}/C_{int})*t_{int}+V_{cm}$. Switch 537 is closed and switch 535 is open during this phase, so the output voltage $V_{int2}$ of the integrating opamp 510 for fourth phase is stored on Capacitor 560.

After the fourth phase of comparison operation using the system 600, capacitors 650 and 660 are coupled to internal analog buffer 670 and internal analog buffer 680 via the switches 639 and 640, respectively. The outputs of the analog buffers 670 and 680 are then transmitted to external analog buffer 655 and external analog buffer 665, respectively via an analog multiplexer 690. The outputs of the external analog buffers 655, 665 (Analog Out P and Analog Out N) can then be sent to a multibit quantizer (not shown) that can perform a multibit quantization on the received differential signal.

Figure 7:
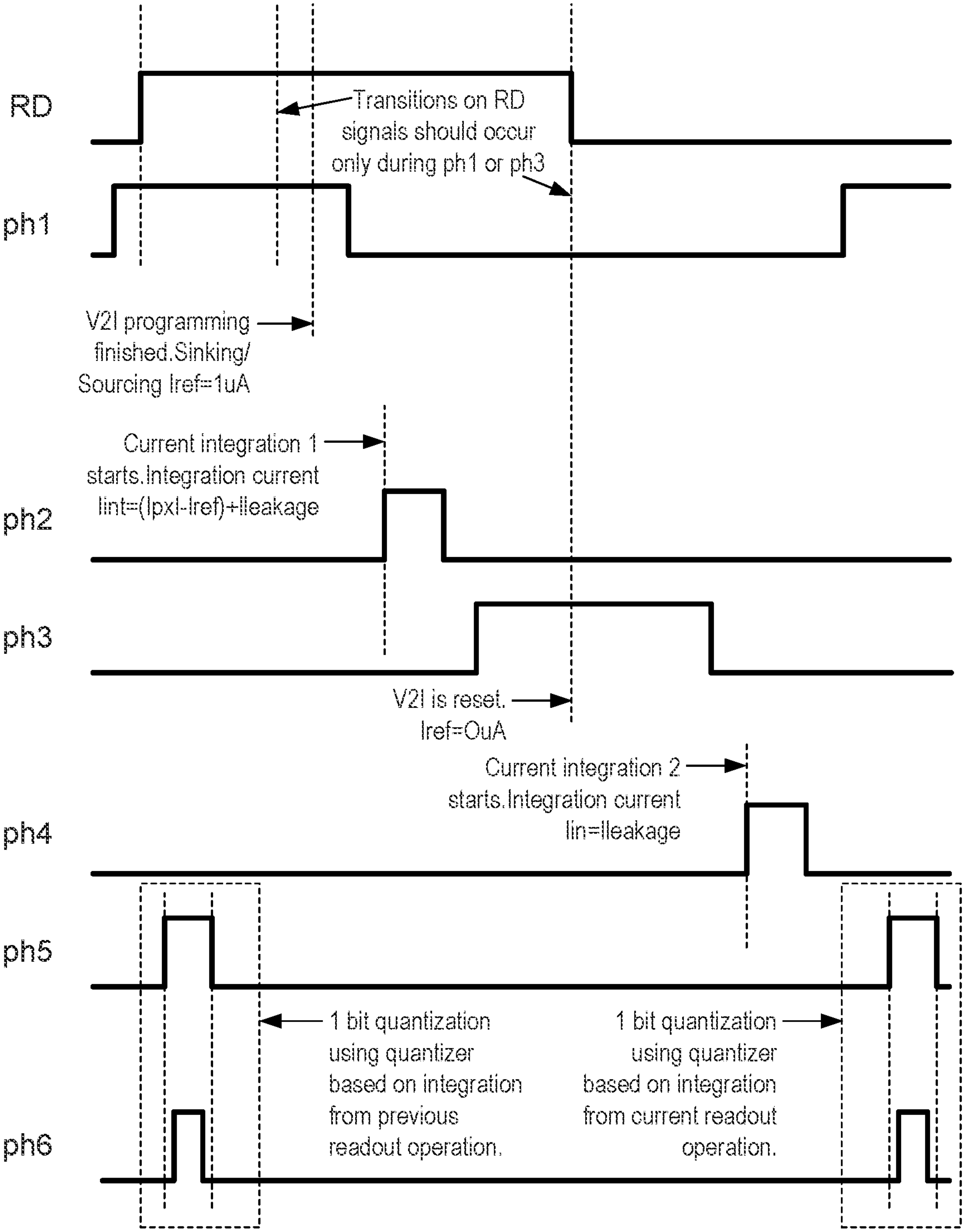
FIG. 7 illustrates a timing diagram of an exemplary comparison operation using the circuit 400 of FIG. 4.

FIG. 7 illustrates a timing diagram for an exemplary comparison operation which can be performed, for example, using the circuit 500 or the system 600 described above. As described above with respect to FIG. 4, the signals Ph1-Ph6 are clock signals that can be generated by a clock signal control register, such as the register Phase_gen 412. Further, as described above, in certain implementations, the first four phases of a readout operation are similar for both single bit and multibit comparison operations. For a multibit comparison operation, however, phase signals ph5 and ph6 remain low while the readout and quantization operations proceed.

As described above with respect to FIGS. 5 and 6, during the first phase of the comparison operation, an integrating opamp (e.g., the opamp 510 or 610) is reset, allowing the integrating opamp to return to a known state. A V2I conversion circuit (e.g., the V2I conversion circuit 13 or 14) is programmed to source or sink a reference current (e.g., a 1 uA current). As described above, during a readout operation a current integrator compares a measured device to the generated reference current and evaluates the difference between the device and reference currents.

As described above with respect to FIGS. 5 and 6, during the second phase of a readout operation, the integrating opamp performs an integration operation on the received reference current, device current and monitor line leakage current. The integrating opamp is then reset again during the third phase of the comparison operation, and the V2I conversion circuit is reset during the third phase after the "RD" control signal (as shown in FIG. 3) is deactivated so that $I_{Ref}$ is 0 uA. Following the third phase of the comparison operation, the integrating opamp performs another integration in the fourth phase, but unlike the integration performed during the first phase, only the monitor line leakage current is integrated in this fourth phase, as described above.

During the fifth phase of a single bit comparison operation, the outputs of the integrating opamp are processed by one or more amplifying opamps (e.g., the opamp 570 and/or the opamp 580). As described above, the outputs of an integrating opamp are voltages that can be stored on capacitors (e.g., the capacitors 52, 530, 620, and/or 630) during a comparison operation.

During a single bit comparison operation, the outputs of the one or more amplifying opamps are transmitted to a quantizer (e.g., the quantizer 560) during the sixth phase of the readout operation, so a single bit quantization operation can be performed. As shown in FIG. 7, in certain implementations, there can be timing overlap between the fifth and sixth phases of a readout operation, but the sixth phase does not begin until input and output voltages of the Opamp have settled.

As shown in FIG. 7, in certain implementations, a second comparison operation can begin during the fifth and sixth phases of a previous comparison operation. That is, the Current Integrator can be reset while its outputs are processed by the Preamp and/or the outputs of the Opamp are being evaluated by the Comparator.

Figure 8:
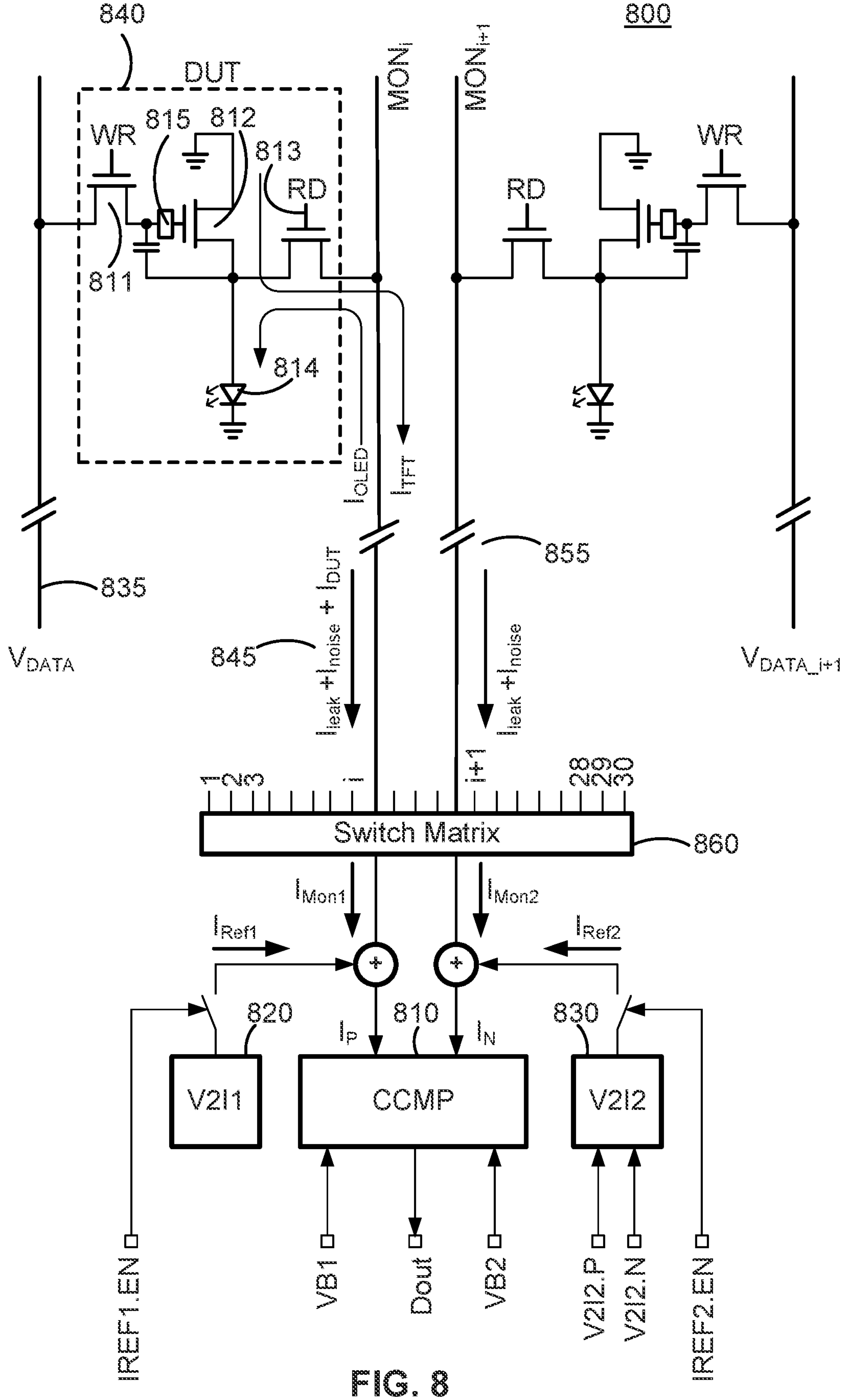
FIG. 8 illustrates a block diagram of a system configured to perform a current comparison operation using a current comparator according to the present disclosure.

FIG. 8 illustrates a block diagram showing a system configured to perform a current comparison operation using a current comparator according to the present disclosure. As described above with respect to FIG. 1, current comparators such as Current Comparator (CCMP) 810 can be configured to calculate variations in device currents based on a comparison with one or more reference currents. In certain implementations, the reference currents are generated by a V2I conversion circuit circuits such as the V2I conversion circuits, 820 and 830, which can each be similar to V2I conversion circuit 200 described above.

In certain implementations, the CCMP 810 can receive current from a pixel of interest via a first monitor line and from an adjacent (e.g., in the immediately adjacent column to the pixel of interest) monitor line on a panel display (not shown). The monitor lines, one for each column in the display panel, run parallel and in close proximity to one another and are approximately the same length. A measurement of a current from a device of interest (e.g., a pixel circuit) can be skewed by the presence of leakage current and noise current during a readout of the device current. To eliminate the contribution of the leakage and noise currents from the measurement, an adjacent monitor line is turned on briefly to allow the leakage and noise currents to be measured. As with the current integrators described above, current flowing through the device of interest is measured, together with its leakage and noise components and a reference current. The device current can include the current through a driving transistor of a pixel ($I_{TFT}$) and/or the current through the pixel's light emitting device ($I_{OLED}$). A voltage corresponding to the measured device current and the reference current is then stored in analog or digital form or produced inside current comparator according to the aspects disclosed herein. As will be described in further detail below, the readout of device currents, leakage currents, noise currents and reference currents takes place over two phases. This two-phase readout procedure can be referred to as correlated-double sampling. After the two readout phases are complete, the stored voltages are amplified and subtracted such that Voltages corresponding to the leakage and noise currents measured from the adjacent monitor line (such as in the immediately adjacent column) are then subtracted from the measured current from the pixel circuit of interest, leaving only a voltage corresponding to the difference between the actual current through the pixel circuit and the reference current for use in compensating for non-uniformities and/or degradation of that pixel circuit.

In other words, current comparators according to the present disclosure exploit the structural similarities among the monitor lines to extract the leakage and noise components from an adjacent monitor line, and then subtracts those unwanted components from a pixel circuit measured by a monitor line of interest to achieve a highly accurate measurement of the device current, which is then quantified as a difference between the measured current (independent of leakage and noise currents) and a reference current. This difference is highly accurate and can be used for accurate and fast compensation of non-uniformities and/or degradation. Because the actual difference between the measured current of a pixel circuit, untarnished by leakage or noise currents inherent in the readout, is quantified, any non-uniformities or degradation effects can be quickly compensated for by a compensation scheme.

As shown in FIG. 8, pixel device 810 includes a write transistor 811, a drive transistor 812, a read transistor 813, light emitting device 814, and storage element 815. The storage element 815 can optionally be a capacitor. In certain implementations, the light emitting device (LED) 814 can be an organic light emitting device (OLED). Write transistor 811 receives programming information from data line 835 (e.g., voltage $V_{DATA}$ based on a write enable control signal, "WR"). The programming information can be stored on the storage element 815 and coupled to the gate of the drive transistor 812 to drive current through the LED 814. When the read transistor 813 is activated (e.g., using a "RD" control signal coupled to the gate of the read transistor 813 as shown in FIG. 8), the monitor line 845 is electrically coupled to the drive transistor 812 and the LED 814 such that current from the LED 814 and/or the drive transistor 812 can be monitored via the monitor line 845.

More specifically, when the read transistor is activated (e.g., via a "RD" control signal), CCMP 810 receives input current from the device 840 via monitor line 845. As described above with respect to FIG. 1, a switch matrix, such as the switch matrix 860, can be used to select which received signal or signals to transmit to CCMP 810. In certain implementations, the switch matrix 340 can receive currents from 30 monitored columns of a display panel (e.g., the display panel 101) and select which of the monitored columns to transmit to the CCMP 810 for further processing. After receiving and processing the currents from the switch matrix 860, the CCMP 810 generates a voltage output, Dout, indicative of the difference between the measured device current and the reference current generated by the V2I conversion circuit 820.

The V2I conversion circuit 820 can optionally be turned on and/or off using control signal IREF1.EN. Additionally, bias voltages VB1 and VB2 can be used to set a virtual ground condition at the inputs of the CCMP 810. In certain implementations, VB1 can be used to set the voltage level for input voltage $I_{in}$, and VB2 can be used as an internal common mode voltage.

In FIG. 8, the CCMP 810 receives a first input current $I_P$ at a first node and a second input current $I_N$ at a second node. The input current $I_P$ is a combination of the current received from device 840 via monitor line 845 and a first reference current, $I_{Ref1}$ generated by the V2I conversion circuit 810. The input current $I_N$ is a combination of the current received via monitor line 855 and the reference current, $I_{Ref2}$ generated by the V2I conversion circuit 830. As described above, a switch matrix, such as the switch matrix 860, can be used to select which received signal or signals to transmit to CCMP 810. In certain implementations, the switch matrix 860 can receive currents from a number of columns of a display panel and select which of the monitored columns to transmit to the CCMP for further processing, as will be described in further detail below. After receiving and processing the currents from the switch matrix 860, the CCMP 810 generates an output signal, $D_{out}$, indicative of the difference between the device and reference currents. The processing of the input currents and the generation of the output signal, $D_{out}$, will be described in more detail below.

As discussed above with respect to current integrator circuits, in certain implementations, a current readout process to generate a current indicative of the differences between measured device currents and one or more reference currents while minimizing the effects of noise takes place over two phases. Current readout processes for CCMPs can also take place over two phases. More specifically, during a first phase of a first implementation, both of the V2I conversion circuit 820 and 830 are turned off, so no reference current flows into CCMP 810. Additionally, a device (e.g., pixel) of interest can be driven such that current flows through the device's driving transistor and/or light emitting device. This current can be referred to as $I_{device}$. In addition to $I_{device}$, the monitor line 845 carries leakage current $I_{leak1}$ and noise current $I_{noise1}$. Even though the pixel coupled to the monitor line 855 is not being driven, the monitor line 855 carries leakage current $I_{leak1}$ and noise current $I_{noise1}$. The noise current on monitor line 855 is essentially the same as the noise current on monitor line 845 because the monitor lines are adjacent to each other.

Therefore, $I_P$ during the first phase of this implementation, is equal to:

$$I_{device}+I_{leak1}+I_{noise1}$$

Similarly, $I_N$ during the first phase of this implementation, is equal to:

$$I_{device}+I_{leak2}+I_{noise1}$$

As will be described in more detail below, an output voltage corresponding to the difference between $I_P$ and $I_N$ is stored on a inside the CCMP 810 after the first phase of the readout process and during a second phase of the readout process. This output voltage is proportional to:

$$I_P-I_N=I_{device}+I_{leak1}-I_{leak2}$$

During the second phase of the first implementation, the V2I conversion circuit 820 is turned on, while the V2I conversion circuit 830 is turned off, so that a single reference current, $I_{Ref1}$ flows into the CCMP 810. Further, unlike the first phase of the implementation, the device of interest coupled to the monitor line 845 is turned off. Therefore, the monitor line 845 only carries leakage current $I_{leak1}$ and noise current $I_{noise2}$ while the monitor line 855 only carries leakage current $I_{leak2}$ and noise current $I_{noise2}$.

Therefore, $I_P$ during the second phase of this implementation, is equal to:

$$I_{Ref1}+I_{leak1}+I_{noise2}$$

Similarly, $I_N$ during the second phase of this implementation, is equal to:

$$I_{leak2}+I_{noise2}$$

The output voltage of the second phase is proportional to:

$$I_{Ref}+I_{leak1}-I_{leak2}$$

After the second phase of the measurement procedure is complete, the outputs of the first phase and the second phase are subtracted (e.g., using a differential amplifier) to generate a output voltage indicative of the difference between the device currents and the reference currents. More specifically, the output voltage of the subtraction operation is proportional to:

$$(I_{device}+I_{leak1}-I_{leak2})-(I_{Ref}+I_{leak1}-I_{leak2})=I_{device}-I_{Ref}.$$

Table 3 summarizes the first implementation of a differential current readout using a CCMP as described above. In Table 3, "RD" represents a read control signal coupled to the gate of the read transistor 813.

TABLE 3

CCMP Differential Readout-First Implementation

| | Sample 1 | Sample 2 |
|---|---|---|
| RD | ON | OFF |
| $I_{device}$ | $I_{TFT}/I_{OLED}$ | 0 |
| Current on Monitor Line 845 | $I_{device}+I_{leak1}+I_{noise1}$ | $I_{leak1}+I_{noise2}$ |
| Current on Monitor Line 855 | $I_{leak2}+I_{noise1}$ | $I_{leak2}+I_{noise2}$ |
| $I_{REF1}$ | 0 | $I_{Ref}$ |
| $I_{REF2}$ | 0 | 0 |
| $I_P$ | $I_{device}+I_{leak1}+I_{noise1}$ | $I_{Ref}+I_{leak1}+I_{noise2}$ |
| $I_N$ | $I_{leak2}+I_{noise1}$ | $I_{Mon2}+I_{Ref}=I_{leak2}+I_{noise2}$ |
| Output voltage proportional to | $I_P-I_N=I_{device}+I_{leak1}-I_{leak2}$ | $I_P-I_N=I_{Ref}+I_{leak1}-I_{leak2}$ |

A second implementation of a current readout using a CCMP also takes place over two phases. During a first phase of the second implementation, the V2I conversion circuit 820 is configured to sink a negative reference current, $-I_{Ref}$, while the V2I conversion circuit 830 is turned off, so only reference current $-I_{Ref}$ flows into the CCMP 810. Additionally, a pixel of interest can be driven such that current $I_{device}$ flows through the pixel's driving transistor and/or light emitting device. As discussed above, in addition to $I_{device}$, the monitor line 845 carries leakage current $I_{leak1}$ and noise current $I_{noise1}$. Even though the pixel coupled to the monitor line 855 is not being driven, the monitor line 855 carries leakage current $I_{leak2}$ and noise current $I_{noise1}$. Again, the noise current on the monitor line 855 is essentially the same as the noise current on the monitor line 845 because the monitor lines are adjacent to each other.

Therefore, $I_P$ during the first phase of the second implementation is equal to:

$$I_{device}-I_{Ref}+I_{leak1}+I_{noise1}$$

Similarly, $I_N$ during the first phase of the second implementation is equal to:

$$I_{leak2}+I_{noise2}$$

And the stored output voltage of the first phase is proportional to:

$$I_{device}-I_{Ref}+I_{leak1}-I_{leak2}$$

During the second phase of the second implementation, Both the V2I conversion circuit 820 and the V2I conversion circuit 830 are turned off, so that no reference current flows into CCMP 810. Further, unlike the first phase of the second implementation, the pixel of interest coupled to monitor line 845 is turned off. Therefore, monitor line 845 only carries leakage current $I_{leak1}$ and noise current $I_{noise2}$, while monitor line 855 only carries leakage current $I_{leak2}$ and noise current $I_{noise2}$.

Therefore, $I_P$ during the second phase of the second implementation is equal to:

$$I_{leak1}+I_{noise2}$$

Similarly, $I_N$ during the second phase of this implementation, is equal to:

$$I_{leak2}+I_{noise2}$$

And the output voltage of the second phase is proportional to:

$$I_{leak1}-I_{leak2}$$

After the second phase of the readout process is complete, the outputs of the first phase and the second phase are subtracted (e.g., using a differential amplifier) to generate a voltage indicative of the difference between the device currents and the reference currents. More specifically, the voltage is proportional to:

$$(I_{device}-I_{Ref}+I_{leak1}-I_{leak2})-(I_{leak1}-I_{leak2})=I_{device}-I_{Ref}.$$

Table 4 summarizes the second implementation of a differential current readout using a CCMP as described above. In Table 4, "RD" represents a read control signal coupled to the gate of the read transistor 813.

TABLE 4

CCMP Differential Readout-Second Implementation

| | Sample 1 | Sample 2 |
|---|---|---|
| RD | ON | OFF |
| $I_{device}$ | $I_{TFT}/I_{OLED}$ | 0 |
| Current on monitor line 845 | $I_{device} + I_{leak1} + I_{noise1}$ | $I_{leak1} + I_{noise2}$ |
| Current on monitor line 855 | $I_{leak2} + I_{noise1}$ | $I_{leak2} + I_{noise2}$ |
| $I_{REF1}$ | $-I_{REF}$ | 0 |
| $I_{REF2}$ | 0 | 0 |
| $I_P$ | $I_{device} - I_{REF} + I_{leak1} + I_{noise1}$ | $I_{leak1} + I_{noise2}$ |
| $I_N$ | $I_{leak2} + I_{noise1}$ | $I_{leak2} + I_{noise2}$ |
| Output voltage proportional to | $I_{device} - I_{REF} + I_{leak1} - I_{leak2}$ | $I_{leak1} - I_{leak2}$ |

Figure 9:
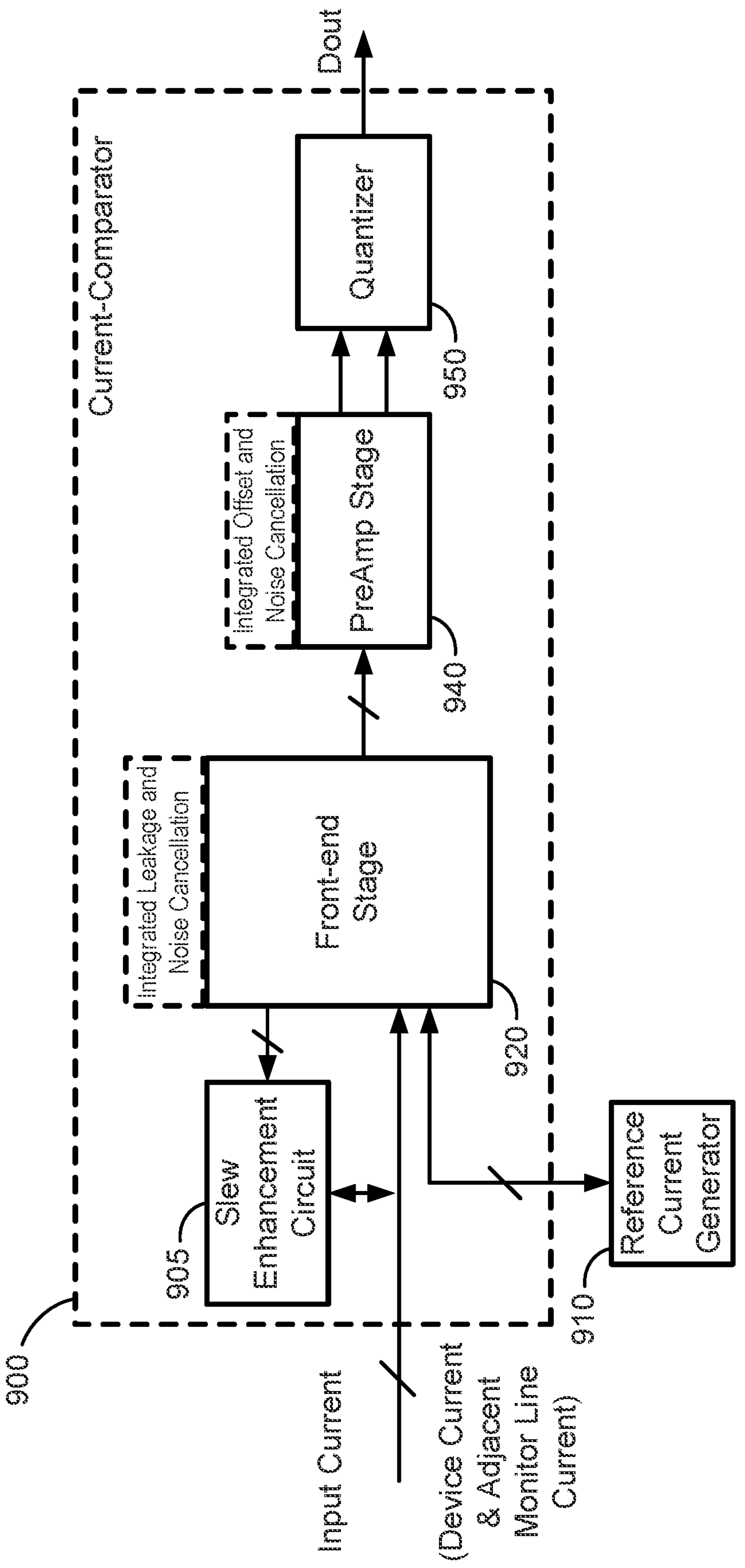
FIG. 9 illustrates another block diagram of a system configured to perform a current comparison operation using a current comparator according to the present disclosure.

FIG. 9 illustrates a block diagram of a current comparator circuit according to the present disclosure. In certain implementations, the current comparator circuit (CCMP) 900 can be similar to CCMP 810 described above with respect to FIG. 8. Like the CCMP 810, the CCMP 900 can evaluate the difference between a device current (e.g., a current from a pixel of interest on a display panel) and a reference current. More specifically, like the CCMP 810, the CCMP 900 can be incorporated into a readout system (e.g., the readout system 10) and evaluate the difference between a device current (e.g., a current from a pixel of interest on a display panel) and a reference current. In certain implementations the CCMP 900 can output a single-bit quantized output ($D_{out}$) indicative of the difference between the device current and the reference current. The quantized output can be output to a controller (not shown) configured to program the measured device (e.g., the measured pixel) to account for shifts in threshold voltage, other aging effects, and the effects of manufacturing non-uniformities.

As described above, CCMPs as disclosed herein account for leakage and noise currents by exploiting the structural similarities among the monitor lines to extract the leakage and noise components from an adjacent monitor line, and then subtracting those unwanted components from a device (e.g., pixel circuit) measured by a monitor line of interest to achieve a highly accurate measurement of the device current, which is then quantified as a difference between the measured current (independent of leakage and noise currents) and a reference current. Because the effects of leakage and noise currents have been accounted for, this difference is highly accurate and can be used for accurate and fast compensation of non-uniformities and/or degradation in the measured device or surrounding devices. FIG. 9 illustrates some of the components included in an exemplary CCMP as disclosed herein.

More specifically, the CCMP 900 can receive input currents from a device of interest (e.g., the device 840) and from and adjacent monitor line on a panel display (not shown). The received input currents can be similar to those discussed above with respect to FIG. 8. In certain implementations, the front-end stage 920 calculates the difference between the input currents from the panel display and the reference currents generated by the reference current generator 910. In certain implementations, the reference current generator 910 can be similar to the V2I conversion circuit 200 described above. The front-end stage 920 processes the input currents to generate an output voltage indicative of the difference between the device current and the reference current. During the generation of the output voltage, the slew enhancement circuit 930 can be used to enhance the settling speed of the components in the front-end stage 920. More specifically, the slew enhancement circuit 930 can monitor of the response of the front-end stage 920 to changes in the voltage level of the panel line or bias voltages input to the front-end stage 920. If the front-end stage 920 leaves the linear operation region, the slew enhancement circuit 930 can then provide a charge/discharge current on-demand until the front-end stage 920 re-enters its linear region of operation.

As will be described in further detail with respect to FIG. 10, the front-end stage 920 can employ a differential architecture. Among other benefits, the use of a differential architecture allows the front-end stage 920 to provide low-noise performance. Further, due to its configuration and its two-stage current readout process, the front-end stage 920 can be configured to minimize the effects of external leakage current and noise and is relatively insensitive to clock signal jitter.

The output of the front-end stage 920 is transmitted to the preamp stage 940 for further processing. More specifically, in certain implementations, the preamp stage 940 receives the output voltages (from the first and second readout phases as described above) from the front-end stage 920 and then mixes and amplifies these voltages to provide a differential input signal to the quantizer 950. In certain implementations, the preamp stage 940 uses a differential architecture to ensure a high power supply rejection ratio (PSRR).

In certain implementations, the preamp stage 940 includes a switched-capacitor network and a fully differential amplifier (not shown). The switched capacitor network can capture and eliminate offset voltage and noise from both the front end stage 920 and the differential amplifier included in the preamp stage 940. Offset cancellation and noise cancellation can be performed before a device current readout operation. After offset and noise cancellation has been performed by the switched capacitor network, the preamp stage 940 can amplify voltages received from the front-end stage 920 to provide a differential input signal to the quantizer 950, as described above.

The output of the preamp stage 940 is transmitted to the quantizer 950. The quantized output of the quantizer is a single-bit value indicative of the difference between the received device current and reference current. The quantized output can be output to a controller (not shown) configured to program the measured device (e.g., the measured pixel) to account for shifts in threshold voltage, other aging effects, and the effects of manufacturing non-uniformities.

Figure 10:
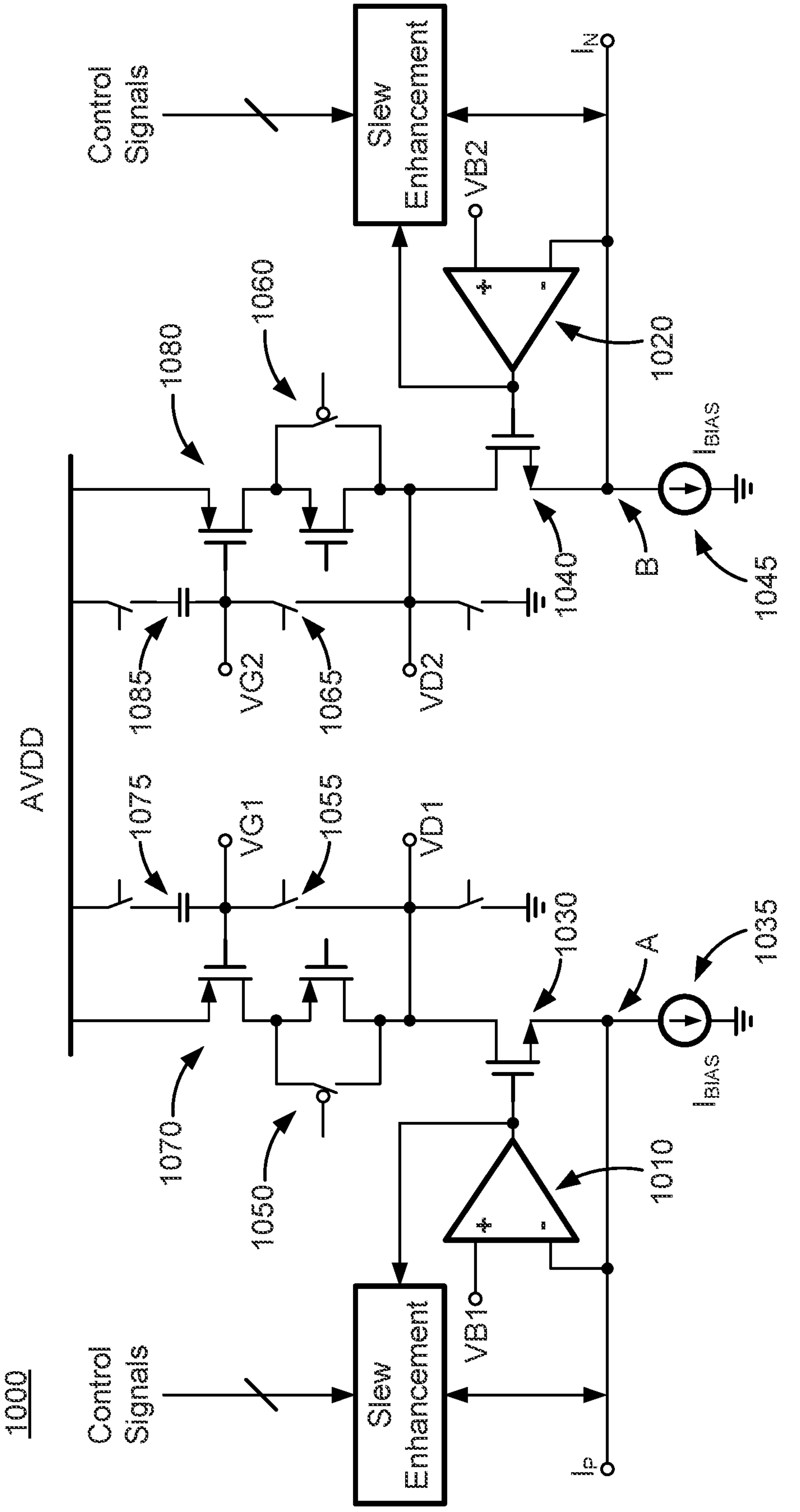
FIG. 10 illustrates a circuit diagram of a current comparator (CCMP) front-end stage circuit according to the present disclosure.

FIG. 10 illustrates a circuit diagram of a current comparator (CCMP) front-end stage circuit according to the present disclosure. In certain implementations, the front-end stage circuit 1000 can be similar to the front-end stage 920 described above with respect to FIG. 9. Like the front-end stage 920, the front-end stage circuit 1000 is configured to calculate the variations in device currents based on a comparison with one or more reference currents. The front-end stage circuit 1000 can be configured to provide a differential readout using a two-phase current comparison operation.

More specifically, during the first phase of the current comparison operation, the operational transconductance amplifier (OTA) 1010 and the OTA 1020 each create a virtual ground condition at the source terminals of transistors 1030 and 1040, respectively. The virtual ground conditions are formed through the use of negative feedback loops at the OTAs 1010 and 1020. Because of the virtual ground conditions at the terminals of the OTA 1010 and the OTA 1020, the input currents $I_P$ and $I_N$ (similar to currents $I_P$ and $I_N$ described above with respect to FIG. 8) flow into nodes A and B, respectively. Therefore, the current through the transistor 1030 (1040) is equal to the sum of external bias current 1035 and input current $I_P$. Similarly, the current through the transistor 1040 is equal to the sum of external bias current 1045 and input current $I_N$. Further, any change in input currents $I_P$ and $I_N$ affects the currents through transistors 1030 and 1040, respectively. The transistors 1050 and 1070 (1060 and 1080) provide a high-resistance active load for transistors 1030 (1040) and convert the input currents $I_P$ and $I_N$ into detectable voltage signals, which are then stored across the capacitors 1075 and 1085, respectively. At the end of the first phase, switches 1055 and 1065 are opened, effectively closing the current paths between nodes VG1 and VD1 (VG2 and VD2).

The second phase of an exemplary current readout operation using the front end stage circuit 1000 is similar to the first phase described above, except that the switches 1055 and 1065 remain open during this phase, and the input currents $I_N$ and $I_P$ vary from the input currents during the first phase. More specifically, the input currents $I_N$ and $I_P$ correspond to the input currents of the second sample described in Tables 3 and 4 above, describing input currents during a CCMP current comparison operation. As described above, in certain implementations, the order of the first and second phases of the current comparison operations described in Tables 3 and 4 can be reversed. At the end of the second phase, because of the characteristics of transistors operating in a saturation mode, the difference between the gate and drain voltages of the transistors 1050 and 1060, respectively, is proportional to the difference between the input currents during the first and second phases of the readout operation. After the second phase of the readout operation is complete, differential signals corresponding to voltages at the nodes VG1, VG2, VD1 and VD2 are transmitted to a preamp stage such as the preamp stage 1040 described above for amplification and mixing as described above.

Figure 11:
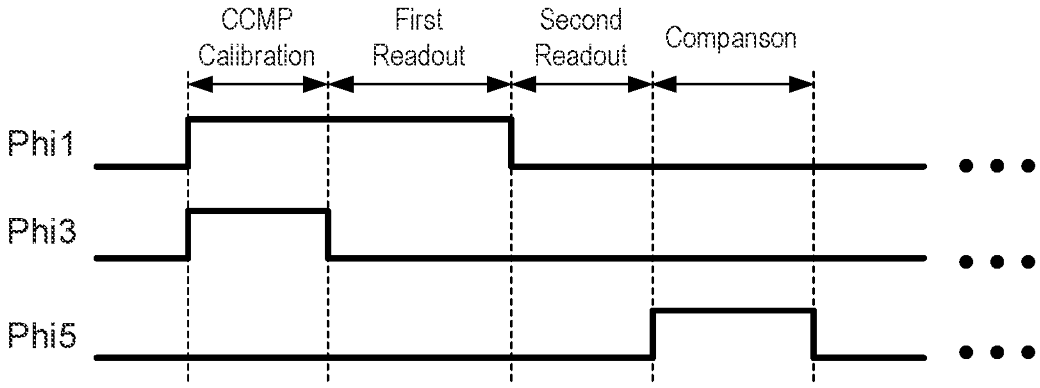
FIG. 11 illustrates a timing diagram of an exemplary comparison operation using the circuit 800 of FIG. 8.

FIG. 11 illustrates a timing diagram for an exemplary comparison operation performed by a current comparator circuit such as, for example, using the circuit 500 or the system 600 described above. As described above with respect to FIG. 8, an exemplary readout operation using a current comparator as disclosed herein can take place over two phases. In addition to the two readout phases, FIG. 11 shows a CCMP calibration phase and a comparison phase, both of which will be described in further detail below. The signals ph1, ph3, and ph5 are clock signals that control the timing of the operations shown in FIG. 10 and can be generated by a clock signal control register, such as the clock control register Phase_gen 412 described above.

During the first phase of the comparison operation shown in FIG. 10, a CCMP (e.g., the CCMP 900) is calibrated, allowing the CCMP to return to a known state before performing the first readout in the comparison operation.

During the second and third phases of the comparison operation, the CCMP performs a first readout and second readout, respectively, on inputs received from monitor lines on a display panel (e.g., the monitor lines 845 and 855 described above with respect to FIG. 8). As described above, a CCMP as disclosed herein can receive currents from a first monitor line carrying current from a device of interest (e.g., a driven pixel on a display line) along with noise current leakage current and from a second monitor line carrying noise current and leakage current. In certain implementations, the first monitor line or the second monitor line also carries a reference current during the second phase of the comparison operation illustrated in FIG. 11. Exemplary monitor line currents for this phase are summarized in Tables 3 and 4 above.

As described above with respect to FIGS. 8 and 9, after receiving and processing input signals during the two phases of a readout operation, a single-bit quantizer incorporated in a CCMP as disclosed herein can generate a single-bit quantized output signal indicative of the differences between the received device and reference currents. During the fourth phase of the of the comparison operation illustrated in FIG. 11, a quantizer compares the signals generated during the first and second readout operations to generate this single-bit output signal. As described above, the quantized output can be output to a controller (not shown) configured to program the measured device (e.g., the measured pixel) to account for shifts in threshold voltage, other aging effects, and the effects of manufacturing non-uniformities.

Figure 12:
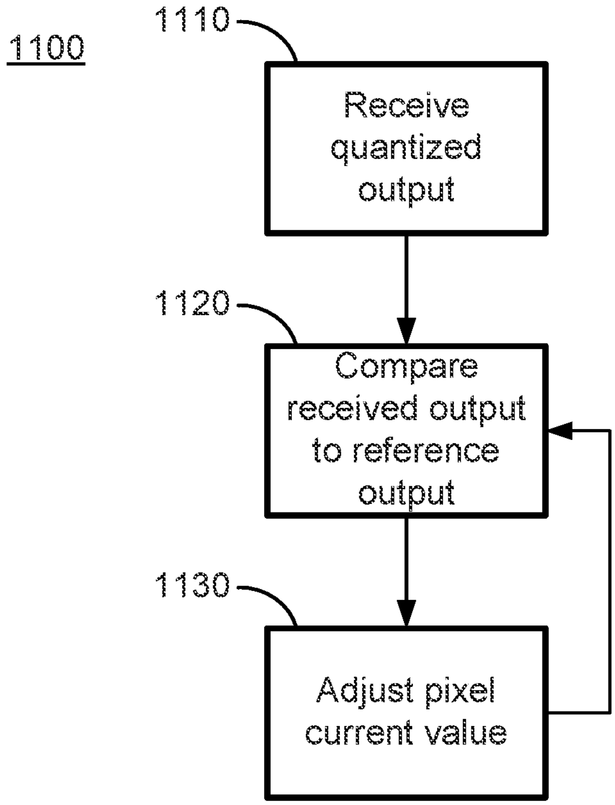
FIG. 12 illustrates an exemplary flowchart of an algorithm for processing the output of a current comparator or a quantizer coupled to the output of a current integrator.

FIG. 12 illustrates, in a flowchart, an exemplary method for processing the quantized output of a current comparator or a current integrator as described herein. As described above, the quantized outputs of the current comparators and current integrators described herein can be processed by a controller (e.g., the controller 112) and used to program the device (e.g., pixel) of interest to account for shifts in threshold voltage, other aging effects, and/or manufacturing non-uniformities.

At block 1110, a processing circuit block receives the output of the comparator or quantizer. At block 1120, the processing circuit block compares the value received output to the a reference value (e.g., the value of a reference current, such as a reference current generated by a V2I conversion circuit as described above). For a single-bit comparator or quantizer output, a high or low output value can indicate that the measured device (e.g., TFT or OLED) current is higher or lower than the reference current generated by a V2I conversion circuit, depending on the specific readout procedure used and which device current is being measured. For example, using an exemplary CCMP to compare pixel and reference currents, if the TFT current is applied to the "$I_P$" input of the CCMP during the first phase of a readout cycle, a low output value indicates that $I_{TFT}$ is less than the Reference Current. On the other hand, if the OLED current is applied to the "$I_P$" input of the CCMP during the first phase of the readout cycle, a low output value indicates that $I_{OLED}$ is higher than the Reference Current. An exemplary state table for a CCMP is shown below in Table 5. For other devices (e.g., CI's, differently configured CCMP's, etc.), other state tables can apply.

TABLE 5

| Comparator Output Table | | | | | |
|---|---|---|---|---|---|
| | | $I_{device}$ + $I_{ref}$ applied during phase | | | |
| | Input to | Phase 1 | | Phase 2 | |
| | CCMP | Dout = 0 | Dout = 1 | Dout = 0 | Dout = 1 |
| TFT | $I_P$ | $I_{TFT} > I_{Ref}$ | $I_{TFT} < I_{Ref}$ | $I_{TFT} < I_{Ref}$ | $I_{TFT} > I_{Ref}$ |
| OLED | $I_P$ | $I_{OLED} < I_{Ref}$ | $I_{OLED} > I_{Ref}$ | $I_{OLED} > I_{Ref}$ | $I_{OLED} < I_{Ref}$ |
| TFT | $I_N$ | $I_{TFT} < I_{Ref}$ | $I_{TFT} > I_{Ref}$ | $I_{TFT} > I_{Ref}$ | $I_{TFT} < I_{Ref}$ |
| OLED | $I_N$ | $I_{OLED} > I_{Ref}$ | $I_{OLED} < I_{Ref}$ | $I_{OLED} < I_{Ref}$ | $I_{OLED} > I_{Ref}$ |

At block 1130, the device current value is adjusted (e.g., using a programming current or voltage) based on the comparison performed at block 1120. In certain implementations, a "step" approach, where the device current value is increased or decreased by a given step size. Blocks 1120 and 1130 can be repeated until the device current value matches the value of the reference current.

For example, in an exemplary implementation, if the Reference Current value is "35," the initial device reference current value is "128," and the step value is "64," correcting the device value can involve the following comparison and adjustment steps:

Step 1: 128>35→decrease device current value by 64 and reduce the step size to 32 (128−64=64; new step=32);

Step 2: 64>35→decrease device current value by 32 and reduce the step size to 16 (64−32=32; new step=16);

Step 3: 32<35→increase device current value by 161 and reduce the step size to 8 (32+16=48; new step=8);

Step 4: 48>35→decrease device current value by 8 and reduce step size to 4 (48−8=40 step=4);

Step 5: 40>35→decrease current pixel value by 4 and reduce step size to 2 (40−4=36 step=2);

Step 6: 36>35→decrease current pixel value by 2 and reduce step size to 1 (36−2=34 step=1);

Step 7: 34<35→increase current pixel value by 1 (34+1=35), and end comparison/adjustment procedure because device currents and reference current values are equal.

Although the method of FIG. 12 is described with respect to a single-bit output of an exemplary current comparator, similar types of methods can be used to process outputs of other circuit configurations (e.g., CIs, differently configured CCMPs, multibit outputs, etc.).

Figure 13:
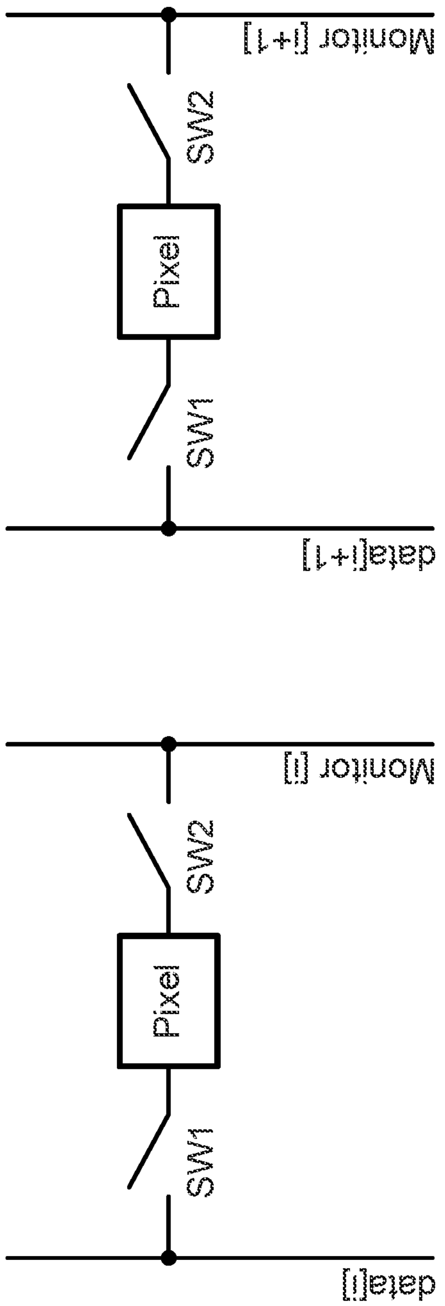
FIG. 13 is a generic schematic of the pixel with a measurement line (Monitor)

FIG. 13 illustrates a generic schematic of the pixel with a measurement or monitor line (labeled Monitor in the figure) for measuring through the monitor line pixel data such as charge, current, or voltage from the pixel (e.g., from the drive switch or the light emitting device or both). In a first example, the monitor line and data line can be shared. In another example, SW2, which connects the pixel circuit to the monitor line, can be always connected.

To reduce one or more common unwanted signals (e.g., noise, leakage, offset, etc.), two samples of pixel data can be measured through monitor line at the same time (or one after another). Then one sample of the sampled data can be used to clean the other sample of sampled data. An example method of cleaning the data includes subtracting the two sample signals (in digital domain or analog domain). In another example, the cleaning can be carried out by making a comparison between the two sampled data.

Figure 14:
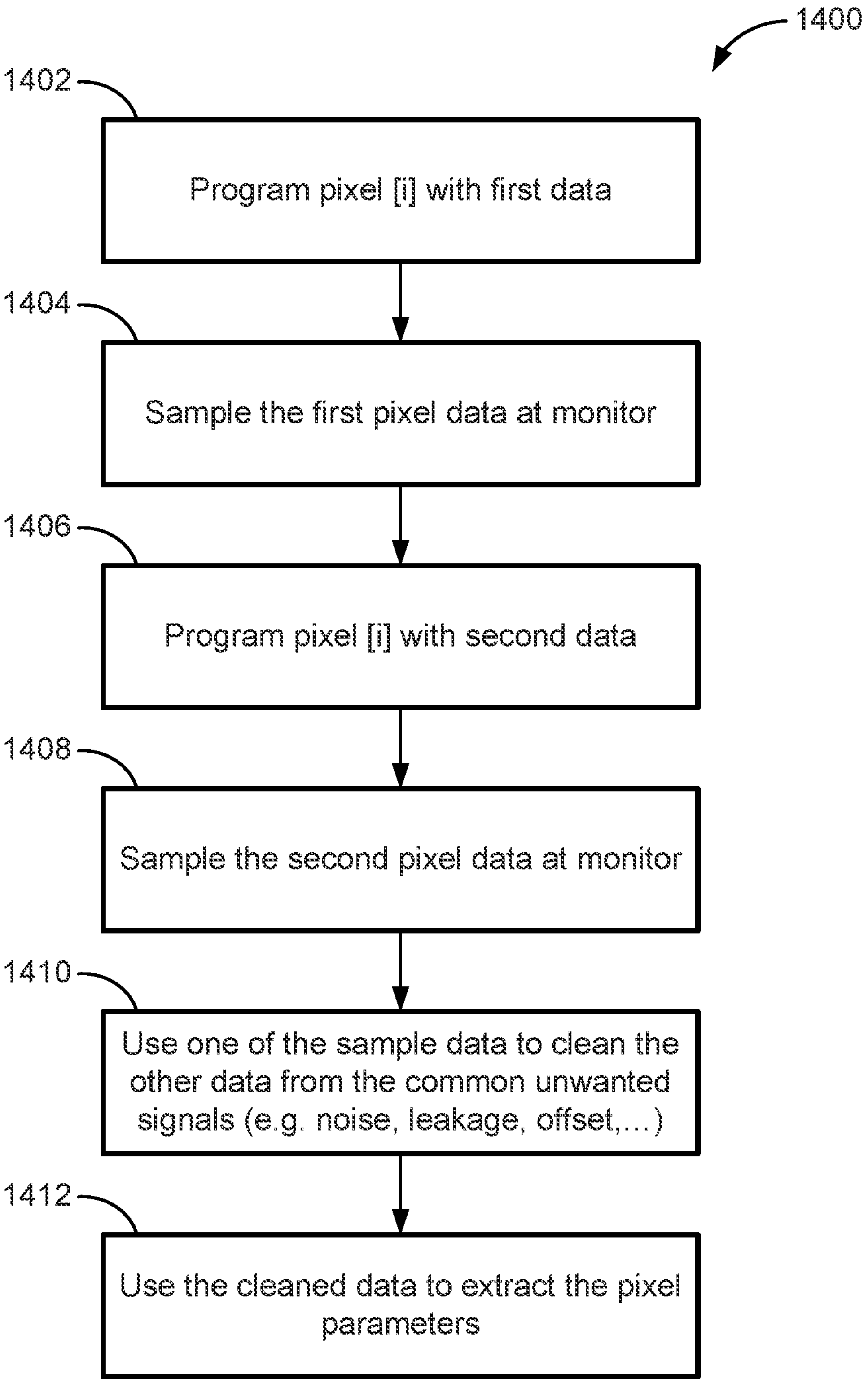
FIG. 14 is a flowchart for a method of sampling two data measurements from the same pixel for cleaning or removing or suppressing common unwanted signals.
Figure 15:
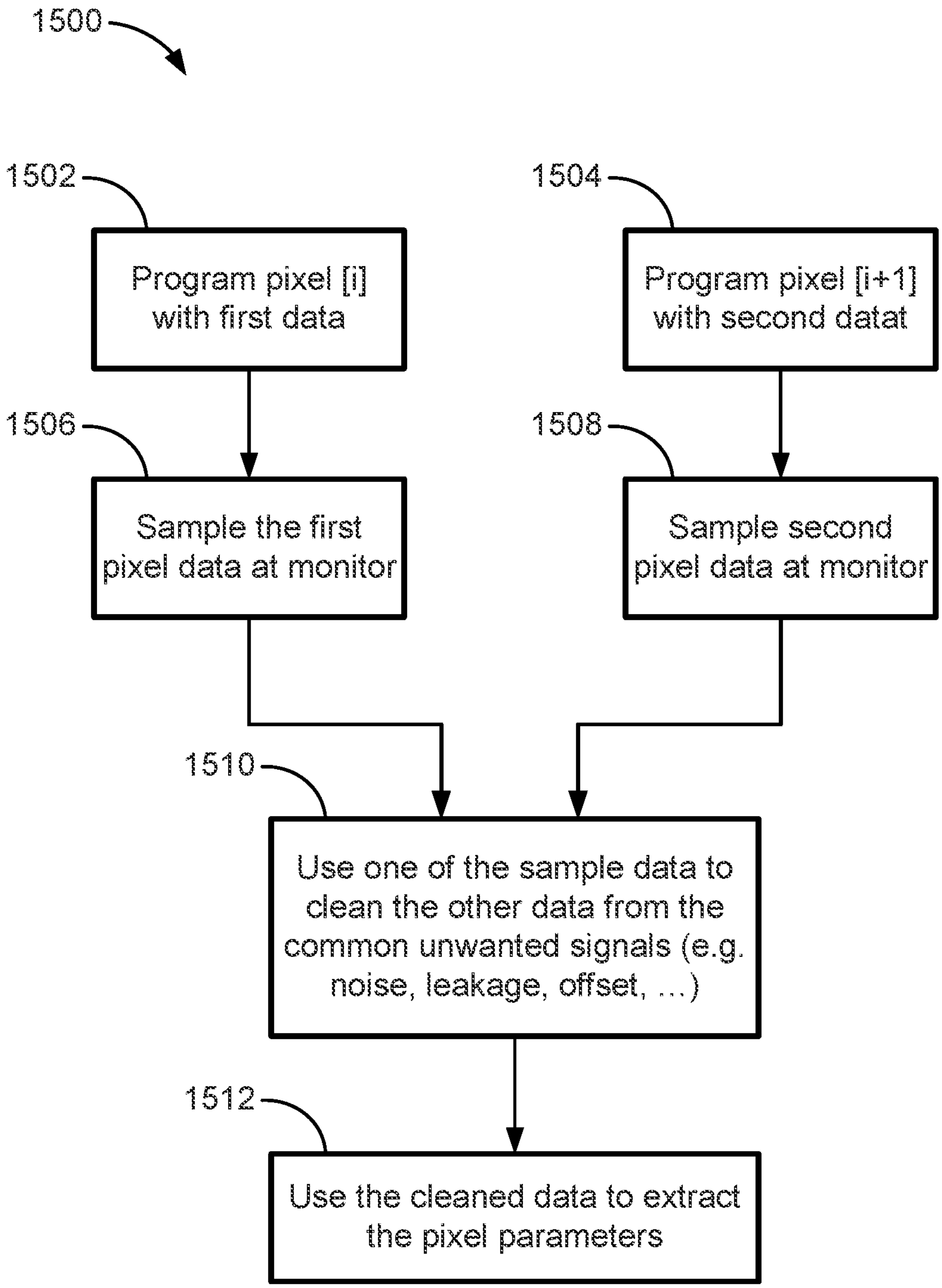
FIG. 15 is a flowchart for a method of sampling two data measurements from different pixels for cleaning common unwanted signals.

In one aspect of the present disclosure, the two pixel data are measured from the same pixel. FIG. 14 shows an example process of extracting pixel data from the same pixel. In another aspect of the present disclosure, two different pixels are used to extract the two pixel data. FIG. 15 shows an example process of extracting pixel data from different pixels.

FIG. 14 is a flowchart illustrating an example method (1400) of sampling two data from the same pixel for cleaning common unwanted signals. These unwanted signals can affect the extraction of the pixel parameters. A first pixel [i] in a first row is programmed via a data[i] line with first data (1402). First pixel data from the first pixel [i] is measured through the Monitor[i] line and stored (1404). The first pixel is then programmed with second data via the data[i] line (1406). Second pixel data from the first pixel [i] is measured through the Monitor line (1408). One of the sampled data (first pixel data or second pixel data) is used to clean the other sampled data (the other of the first pixel data or the second pixel data) from common unwanted signals (e.g., noise, leakage, offset, etc.) (1410). The cleaned data is used to extract one or more pixel parameters that affect the intended brightness to be emitted by the light emitting device (e.g., aging, threshold voltage shift, non-uniformity, mobility) (1412). A pixel parameter can include aging of the drive transistor, aging of the light emitting device, a process non-uniformity parameter, a mobility parameter, a threshold voltage of the drive transistor or a change thereof, or a threshold voltage of the light emitting device or a change thereof. This method leads to a highly accurate pixel parameter extraction that is not influenced or tainted by common unwanted signals that can skew the extraction.

FIG. 15 is a flowchart illustrating another method (1500) of sampling two data from different pixels for cleaning common unwanted signals. A first pixel in row [i] is programmed with first data (1502). At the same time, a second pixel in row [i+1] is programmed with second data (1504). Next, the first pixel data from the first pixel is sampled or measured using the associated Monitor line (1506), and second pixel data from the second pixel is sampled or measured using the associated Monitor line (1508). One of the sampled data (from the first pixel or the second pixel) is used to clean the other sampled data from common unwanted signals (e.g., noise, leakage, offset, etc.) (1510). The cleaned data is used to extract one or more pixel parameters that affect the intended brightness to be emitted by the light emitting device (1512).

In a variation of the method shown in FIGS. 14 and 15, one of the first or second programming data can be chosen to turn off the pixel shown in FIG. 13. In another aspect of the present disclosure, the two sampled data can be compared, and the first or second programming data can be adjusted accordingly to make the two samples identical. In another aspect of the present disclosure, external (to the pixel) signals can be sampled while the pixel data is being sampled. In still another aspect of the present disclosure, the difference of the pixel data and external signals can be sampled.

In an aspect of the present disclosure, the external signal can have different values during two sampling. For example, during the first or second sampling the external signal can be zero and during the other sampling, it can be non-zero.

The concepts described above in connection with FIGS. 13-15 can be combined with any aspect described in connection with FIGS. 1-12 above.

As used herein, the terms "may" and "can optionally" are interchangeable. The term "or" includes the conjunctive "and," such that the expression A or B or C includes A and B, A and C, or A, B, and C.

While particular implementations and applications of the present disclosure have been illustrated and described, it is to be understood that this disclosure is not limited to the precise construction and compositions disclosed herein and that various modifications, changes, and variations can be apparent from the foregoing descriptions without departing from the scope of the invention as defined in the appended claims.

The invention claimed is:

1. A method of measuring a display having a plurality of pixel circuits each including a storage device, a drive transistor, and a light emitting device, the method comprising:

sampling from the plurality of pixel circuits a first electrical signal comprising at least one unwanted electrical signal from within said display and sampling from the plurality of pixel circuits a second electrical signal comprising said at least one unwanted electrical signal from within the display, said sampling of the first and second electrical signals from the plurality of pixel circuits for generating respective first and second pixel measurement data; and generating cleaned pixel data by removing common unwanted signal data corresponding to the at least one unwanted electrical signal from the first pixel measurement data with use of the second pixel measurement data.

2. The method of claim 1, wherein sampling the first electrical signal and the second electrical signal are carried out simultaneously or one after another.

3. The method of claim 1, wherein generating cleaned pixel data includes generating a difference between the first pixel measurement data and the second pixel measurement data in an analog or a digital domain.

4. The method of claim 1, wherein generating cleaned pixel data includes comparing the first pixel measurement data and the second pixel measurement data.

5. The method of claim 1, wherein the at least one unwanted electrical signal from the plurality of pixels includes any one or more of noise, leakage, or offset.

6. The method of claim 1, further comprising extracting one or more pixel parameters based on the cleaned data.

7. The method of claim 6, wherein the one or more pixel parameters includes any one or more of aging of a drive transistor, aging of a light emitting device, a process non-uniformity parameter, a mobility parameter, a threshold voltage of the drive transistor or a change thereof, or a threshold voltage of the light emitting device or a change thereof.

8. The method of claim 1, wherein sampling the first electrical signal includes sampling a first pixel circuit of the plurality of pixel circuits at a first time, and wherein sampling the second electrical signal includes sampling the first pixel circuit of the plurality of pixel circuits at a second time different from the first time.

9. The method of claim 8, further comprising:

extracting a pixel parameter for the first pixel circuit based on the cleaned pixel data.

10. The method of claim 8, further comprising: prior to sampling the first pixel circuit at the first time, programming the first pixel circuit with first programming data; and prior to sampling the first pixel circuit at the second time, programming the first pixel circuit with second programming data different from the first programming data.

11. The method of claim 10, further comprising adjusting at least one of the first programming data and the second programming data so that the first pixel measurement data is the same as the second pixel measurement data.

12. The method of claim 1, wherein sampling the first electrical signal includes sampling a first pixel circuit of the plurality of pixel circuits, and wherein sampling the second electrical signal includes sampling a second pixel circuit of the plurality of pixel circuits in a different row from the row of the first pixel circuit.

13. The method of claim 12, further comprising:

extracting a pixel parameter for the first pixel circuit or the second pixel circuit based on the cleaned pixel data.

14. The method of claim 12, further comprising: prior to sampling the first pixel circuit, programming the first pixel circuit with first programming data; and prior to sampling the second pixel circuit, programming the second pixel circuit with second programming data different from the first programming data.

15. The method of claim 14, further comprising adjusting at least one of the first programming data and the second programming data so that the first pixel measurement data is the same as the second pixel measurement data.

16. The method of claim 1, further comprising sampling a signal external to the plurality of pixel circuits simultaneously with said sampling the first and second electrical signals.

17. The method of claim 16, further comprising sampling a difference between a sample of the first electrical signal and a first sample of the sampled external signal.

18. The method of claim 16, further comprising sampling at least one difference between samples of the first and second electrical signals and the sampled external signal.

19. The method of claim 18, wherein one of a first and a second sample of the sampled external signal has a zero value, and the other of the first and the second sample of the sampled external signal has a non-zero value.

* * * * *